(12) United States Patent
Zhao et al.

(10) Patent No.: US 9,603,138 B2
(45) Date of Patent: Mar. 21, 2017

(54) METHOD AND DEVICE FOR SENDING AND DETECTING ENHANCED PHYSICAL DOWNLINK CONTROL CHANNEL

(71) Applicant: China Academy of Telecommunications Technology, Beijing (CN)

(72) Inventors: Rui Zhao, Beijing (CN); Xueming Pan, Beijing (CN); Rakesh Tamrakar, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 90 days.

(21) Appl. No.: 14/419,048

(22) PCT Filed: Aug. 2, 2013

(86) PCT No.: PCT/CN2013/080682
§ 371 (c)(1),
(2) Date: Feb. 2, 2015

(87) PCT Pub. No.: WO2014/019539
PCT Pub. Date: Feb. 6, 2014

(65) Prior Publication Data
US 2015/0208390 A1    Jul. 23, 2015

(30) Foreign Application Priority Data

Aug. 3, 2012    (CN) .......................... 2012 1 0275596

(51) Int. Cl.
*H04W 72/04*    (2009.01)
(52) U.S. Cl.
CPC ................................ *H04W 72/042* (2013.01)

(58) Field of Classification Search
CPC .................................................. H04W 72/042
See application file for complete search history.

(56) References Cited

U.S. PATENT DOCUMENTS

| | | | | |
|---|---|---|---|---|
| 2011/0019776 A1* | 1/2011 | Zhang | .................. | H04L 5/0023 375/340 |
| 2012/0088534 A1* | 4/2012 | Lee | ...................... | H04B 7/0404 455/509 |

(Continued)

FOREIGN PATENT DOCUMENTS

| | | |
|---|---|---|
| CN | 102355732 | 2/2012 |
| CN | 102395206 | 3/2012 |
| CN | 102420685 | 4/2012 |

OTHER PUBLICATIONS

3GPP TSG RAN WG1 #69, "Association between antenna ports and ePDCCH transmissions", May 21-25, 2012; R1-122249.

(Continued)

*Primary Examiner* — Brian D Nguyen
(74) *Attorney, Agent, or Firm* — Foley & Lardner LLP; James F. Ewing; Paul M. H. Pua

(57) ABSTRACT

Disclosed are a method and a device for sending and detecting an enhanced physical downlink control channel (E-PDCCH), relating to the field of wireless communications, and used for solving the problem of how to send downlink control information through the E-PDCCH. In the method, when a current subframe needs to send downlink control information to a terminal by adopting a frequency domain distributed transmission mode, a base station selects, according to the current aggregation level, at least one available distributed E-CCE in a distributed E-PDCCH time frequency resource area of the current subframe, and uses the selected distributed E-CCE to send the downlink control (Continued)

information to the terminal. The present application solves the problem of how to transmit downlink control information through the E-PDCCH.

8 Claims, 12 Drawing Sheets

(56) References Cited

U.S. PATENT DOCUMENTS

| | | | | |
|---|---|---|---|---|
| 2012/0300728 | A1* | 11/2012 | Lee | H04J 13/16 370/329 |
| 2013/0039284 | A1* | 2/2013 | Marinier | H04L 5/001 370/329 |
| 2013/0039291 | A1* | 2/2013 | Blankenship | H04L 5/001 370/329 |

OTHER PUBLICATIONS

3GPP TSG RAN WG1 Meeting #68bis, "DMRS Port Assignment for E-PDCCH", Research in Motion, UK Limited; Mar. 26-30, 2012.
3GPP TSG RAN WG1 Meeting #69, "DMRS Port Assignment to E-PDCCH and Channel Estimation Complexity", Research in Motion, UK Limited; May 21-25, 2012; R1-122723.
International Search Report for PCT/CN2013/080682 mailed Nov. 7, 2013.
CATT "Search space design for E-PDCCH" 3GPP TSG RAN WG1 Meeting #69 R1-122050, Prague, Czech Republic, May 21-25, 2012.

* cited by examiner

METHOD AND DEVICE FOR SENDING AND DETECTING ENHANCED PHYSICAL DOWNLINK CONTROL CHANNEL

This application is a US National Stage of International Application No. PCT/CN2013/080682, filed on 2 Aug. 2013, designating the United States, and claiming the benefit of Chinese Patent Application No. 201210275596.7, filed with the Chinese Patent Office on Aug. 3, 2012 and entitled "Method and device for transmitting and detecting enhanced physical downlink control channel", which is hereby incorporated by reference in its entirety.

FIELD OF THE INVENTION

The present invention relates to the field of wireless communications and particularly to a method and device for transmitting and detecting an enhanced physical downlink control channel.

BACKGROUND OF THE INVENTION

In a Long Term Evolution (LTE) Release 8/9/10 (Rel-8/9/10) system, Physical Downlink Control Channels (PDCCHs) are transmitted in each radio sub-frame, and particularly they are transmitted in first N Orthogonal Frequency Division Multiplexing (OFDM) symbols of a sub-frame, where N may take the values of 1, 2, 3 and 4 with N=4 being only allowed to occur in a system with the system bandwidth of 1.4 MHz, and the first N OFDM symbols are referred here to a legacy PDCCH region, as illustrated in FIG. 1.

In the LTE Rel-8/9/10 system, the control region in which PDCCHs are transmitted consists of logically divided Control Channel Elements (CCEs), where a CCE consists of nine Resource Element Groups (REGs), and the CCE is mapped to the REGs spanning the entire bandwidth using the method based on interleaving of the REGs. An REG consists of four Resource Elements (REs) duplicated in the time domain and adjacent in the frequency domain, where REs for transmitting common Reference Symbol (RS) are not included in the REs of which the REG consists. An REG is defined particularly as illustrated in FIG. 2. Reference can be made to the description in the Technical Specification 36.211 for the particular definition of an REG and mapping of a CCE to REGs.

Downlink Control Information (DCI) is also transmitted per CCE, and a piece of DCI for a User Equipment (UE) can be transmitted in N consecutive CCEs, where N in the LTE system may take the value of 1, 2, 4 or 8, referred to as a CCE aggregation level. The UE performs PDCCH blind detection in the control region to search for a PDCCH transmitted thereto in a PDCCH search space thereof for which blind detection is required, where blind detection refers to that a decoding attempt is made for different DCI formats and CCE aggregation levels using a Radio Network Temporary Identity (RNTI) of the UE, and if there is correct decoding, then DCI for the UE is received. The UE performs blind detection on the control region in each downlink sub-frame in a non-Discontinuous Reception (non-DRX) state to search for a PDCCH.

In a sub-frame of the LTE system, PDCCH search space in which a blind detection needs to be performed for some UE includes two kinds of PDCCH search spaces, which are a Common Search Space (CSS) and a UE-specific Search Space (UESS). The common search space is primarily configured to transmit DCI for scheduling cell-specific control information (e.g., system information, paging information, power-control commands for a group of UEs, etc.), and the UE-specific search space is primarily configured to transmit DCI for respective UE resource assignments. The common search space starts with a CCE serial number of 0, and only two CCE aggregation levels of 4 and 8 are supported in the common search space; and the UE-specific search space starts with a CCE location related to the current sub-frame number, the RNTI of the UE, etc., and CCE aggregation levels of 1, 2, 4 and 8 are supported in the UE-specific search space. Table 1 depicts a search space in which blind detection by a UE is required in a downlink sub-frame, where L represents the index of an aggregation level, Size represents the number of CCEs in which blind detection is required at the corresponding aggregation level, and $M^{(L)}$ represents the number of PDCCH candidates for which blind detection is required at the corresponding aggregation level. FIG. 3 further illustrates a schematic diagram of the blind detection procedure. As depicted in Table 1, a UE needs to attempt on 22 PDCCHs in a downlink sub-frame, including 6 PDCCHs in total in a common search space and 16 PDCCHs in total in a UE-specific search space.

TABLE 1

Search space $S_k^{(L)}$

| Type | Aggregation level L | Size [in CCEs] | The number of PDCCH candidates $M^{(L)}$ |
| --- | --- | --- | --- |
| UESS | 1 | 6 | 6 |
|  | 2 | 12 | 6 |
|  | 4 | 8 | 2 |
|  | 8 | 16 | 2 |
| CSS | 4 | 16 | 4 |
|  | 8 | 16 | 2 |

Physical Downlink Control Channels (R-PDCCHs) for a relay system are defined in the LTE Rel-10 system to occupy a Physical Downlink Shared Channel (PDSCH), and FIG. 4 illustrates a structural diagram of R-PDCCH and PDSCH resources, where the R-PDCCHs is configured to transmit control signaling from the base station to the relay node, and the PCFICH stands for a Physical Control Format Indicator Channel.

Particularly resources occupied by the R-PDCCHs are configured by higher-layer signaling. Physical Resource Block (PRB) pair resources occupied by the R-PDCCHs may be consecutive or may be inconsecutive. A search space of the R-PDCCHs is defined so that there is no common search space for the R-PDCCHs but there is only a relay-specific R-PDCCH search space, where Downlink grant (DL grant) and Uplink grant (UL grant) are transmitted in a Time Division Multiplexing (TDM) manner:

The DL grant is transmitted in a first timeslot, and the relay node monitors the DCI format 1A, and a DCI format related to a transmission mode, in the first timeslot; and The UL grant is transmitted in a second timeslot, and the relay node monitors the DCI format 0, and a DCI format related to the transmission mode, in the second timeslot.

Moreover there are two transmission modes defined for transmission of the R-PDCCHs, which are an interleaving mode and a non-interleaving mode respectively, and different search spaces are also defined in the Rel-10 for the R-PDCCHs in the two transmission modes:

The definition of the PDCCHs, the aggregation levels, and a CCE being a unit, in the LTE Rel-8/9/10 system are still applicable in the interleaving mode, where each CCE is composted of nine REGs, the CCE is mapped to the REGs still through interleaving as defined for the PDCCHs, and a search space thereof is designed the same as that of the PDCCHs in the LTE Rel-8/9/10 to start at a location related to a relay RNTI and a sub-frame number; and The unit of an aggregation level in the non-interleaving mode is a Physical Resource Block (PRB), where there is invariable mapping of a resource occupied by a channel candidate in a search space to an order of PRBs, and the search space thereof is designed so that a starting location of the specific search space always lies in a VRB logically numbered 0, and there are logically consecutive resources occupied by a set of E-PDCCH candidates at an aggregation level.

In the discussion of E-PDCCHs in the LTE Rel-11, it has been determined that there are frequency-domain consecutive (localized) and frequency-domain inconsecutive (distributed) transmission modes for the E-PDCCH, which are applicable to different scenarios. Typically the localized transmission mode is generally applicable to such a scenario that the base station can obtain comparatively precise channel information fed back by the UE and adjacent cell interference will not vary sharply from one sub-frame to another, where the base station selects consecutive frequency resources with a comparatively good quality, according to Channel State Information (CSI) fed back by the UE, to transmit E-PDCCHs for the UE and performs pre-coding/beam-forming to improve the performance of transmission. If no accurate channel information is available or adjacent cell interference varies sharply from one sub-frame to another and is unpredictable, then E-PDCCHs need to be transmitted in the distributed transmission mode, that is, they are transmitted over frequency resources inconsecutive in frequency for a frequency diversity gain.

In summary, there has been absent so far a specific solution to transmission of downlink control information over E-PDCCHs in the localized transmission mode or the distributed transmission mode.

SUMMARY OF THE INVENTION

Embodiments of the invention provide a first method and device for transmitting and detecting an enhanced physical downlink control channel so as to address the problem of how to transmit downlink information over E-PDCCHs in the localized transmission mode.

A method for transmitting an Enhanced Physical Downlink Control Channel (E-PDCCH) includes:

when downlink control information needs to be transmitted to a User Equipment (UE) in a current sub-frame in a localized transmission mode, selecting, by a base station, at least one available localized Enhanced Control Channel Element (E-CCE) in a localized E-PDCCH time-frequency resource region of the current sub-frame at a current aggregation level; and transmitting, by the base station, the downlink control information to the UE in the selected localized E-CCE;

wherein the localized E-PDCCH time-frequency resource region includes at least one E-PDCCH resource cluster, each of which consists of at least one Physical Resource Block (PRB) pair consecutive in frequency domain in the current sub-frame; and each E-PDCCH resource cluster includes at least one localized E-CCE, and each localized E-CCE is a set of a part of Resource Elements (REs) in a PRB pair.

A method for detecting an E-PDCCH includes:

determining, by a UE, a localized E-PDCCH time-frequency resource region in a current sub-frame, and aggregation levels supported in a localized transmission mode; and performing, by the UE, channel blind detection on a localized E-CCE in the localized E-PDCCH time-frequency resource region respectively at the respective aggregation levels supported in the localized transmission mode;

wherein the localized E-PDCCH time-frequency resource region includes at least one E-PDCCH resource cluster, each of which consists of at least one PRB pair consecutive in frequency domain in the current sub-frame; and each E-PDCCH resource cluster includes at least one localized E-CCE, and each localized E-CCE is a set of a part of REs in a PRB pair.

A base station includes:

a resource selecting unit configured, when downlink control information needs to be transmitted to a UE in a current sub-frame in a localized transmission mode, to select at least one available localized Enhanced Control Channel Element (E-CCE) in a localized E-PDCCH time-frequency resource region of the current sub-frame at a current aggregation level; and an information transmitting unit configured to transmit the downlink control information to the UE in the selected localized E-CCE;

wherein the localized E-PDCCH time-frequency resource region includes at least one E-PDCCH resource cluster, each of which consists of at least one Physical Resource Block (PRB) pair consecutive in frequency domain in the current sub-frame; and each E-PDCCH resource cluster includes at least one localized E-CCE, and each localized E-CCE is a set of a part of Resource Elements (REs) in a PRB pair.

A UE includes:

a determining unit is configured to determine a localized E-PDCCH time-frequency resource region in a current sub-frame, and aggregation levels supported in a localized transmission mode; and a blind detection unit is configured to perform channel blind detection on a localized E-CCE in the localized E-PDCCH time-frequency resource region respectively at the respective aggregation levels supported in the localized transmission mode to obtain downlink control information;

wherein the localized E-PDCCH time-frequency resource region includes at least one E-PDCCH resource cluster, each of which consists of at least one PRB pair consecutive in frequency domain in the current sub-frame; and each E-PDCCH resource cluster includes at least one localized E-CCE, and each localized E-CCE is a set of a part of REs in a PRB pair.

In the first solution according to the embodiments of the invention, when downlink control information needs to be transmitted to a UE in a current sub-frame in a localized transmission mode, a base station selects at least one available localized Enhanced Control Channel Element (E-CCE) in a localized E-PDCCH time-frequency resource region of the current sub-frame at a current aggregation level and transmits the downlink control information to the UE in the selected localized E-CCE; and the UE performs channel blind detection on the localized E-CCE in the localized E-PDCCH time-frequency resource region respectively at the respective aggregation levels supported in the localized transmission mode. As can be apparent, this solution enables a solution to transmission of E-PDCCHs in the localized transmission mode to thereby address the problem of how to transmit downlink control information over E-PDCCHs in the localized transmission mode.

Embodiments of the invention provide a second method and device for transmitting and detecting an enhanced physical downlink control channel so as to address the problem of how to transmit downlink information over E-PDCCHs in the distributed transmission mode.

A method for transmitting an Enhanced Physical Downlink Control Channel (E-PDCCH) includes:

when downlink control information needs to be transmitted to a UE in a current sub-frame in a distributed transmission mode, selecting, by a base station, at least one available distributed E-CCE in a distributed E-PDCCH time-frequency resource region of the current sub-frame at a current aggregation level; and transmitting, by the base station, the downlink control information to the UE in the selected distributed E-CCE;

wherein the distributed E-PDCCH time-frequency resource region includes N E-PDCCH resource clusters with N representing an integer no less than 2; each E-PDCCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

A method for detecting an E-PDCCH includes:

determining, by a UE, a distributed E-PDCCH time-frequency resource region in a current sub-frame, and aggregation levels supported in a distributed transmission mode; and performing, by the UE, channel blind detection on a distributed E-CCE in the distributed E-PDCCH time-frequency resource region respectively at the respective aggregation levels supported in the distributed transmission mode;

wherein the distributed E-PDCCH time-frequency resource region includes N E-PDCCH resource clusters with N representing an integer no less than 2; each E-PDCCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

A base station includes:

a resource selecting unit configured, when downlink control information needs to be transmitted to a UE in a current sub-frame in a distributed transmission mode, to select at least one available distributed E-CCE in a distributed E-PDCCH time-frequency resource region of the current sub-frame at a current aggregation level; and an information transmitting unit configured to transmit the downlink control information to the UE in the selected distributed E-CCE;

wherein the distributed E-PDCCH time-frequency resource region includes N E-PDCCH resource clusters with N representing an integer no less than 2; each E-PDCCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

A UE includes:

a determining unit is configured to determine a distributed E-PDCCH time-frequency resource region in a current sub-frame, and aggregation levels supported in a distributed transmission mode; and a blind detection unit is configured to perform channel blind detection on a distributed E-CCE in the distributed E-PDCCH time-frequency resource region respectively at the respective aggregation levels supported in the distributed transmission mode to obtain downlink control information;

wherein the distributed E-PDCCH time-frequency resource region includes N E-PDCCH resource clusters with N representing an integer no less than 2; each E-PDCCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

In the second solution according to the embodiments of the invention, when downlink control information needs to be transmitted to a UE in a current sub-frame in a distributed transmission mode, a base station selects at least one available distributed E-CCE in a distributed E-PDCCH time-frequency resource region of the current sub-frame at a current aggregation level and transmits the downlink control information to the UE in the selected distributed E-CCE; and the UE performs channel blind detection on the distributed E-CCE in the distributed E-PDCCH time-frequency resource region respectively at the respective aggregation levels supported in the distributed transmission mode. As can be apparent, this solution enables a solution to transmission of E-PDCCHs in the distributed transmission mode to thereby address the problem of how to transmit downlink control information over E-PDCCHs in the distributed transmission mode.

DETAILED DESCRIPTION OF THE EMBODIMENTS

Figure 1:
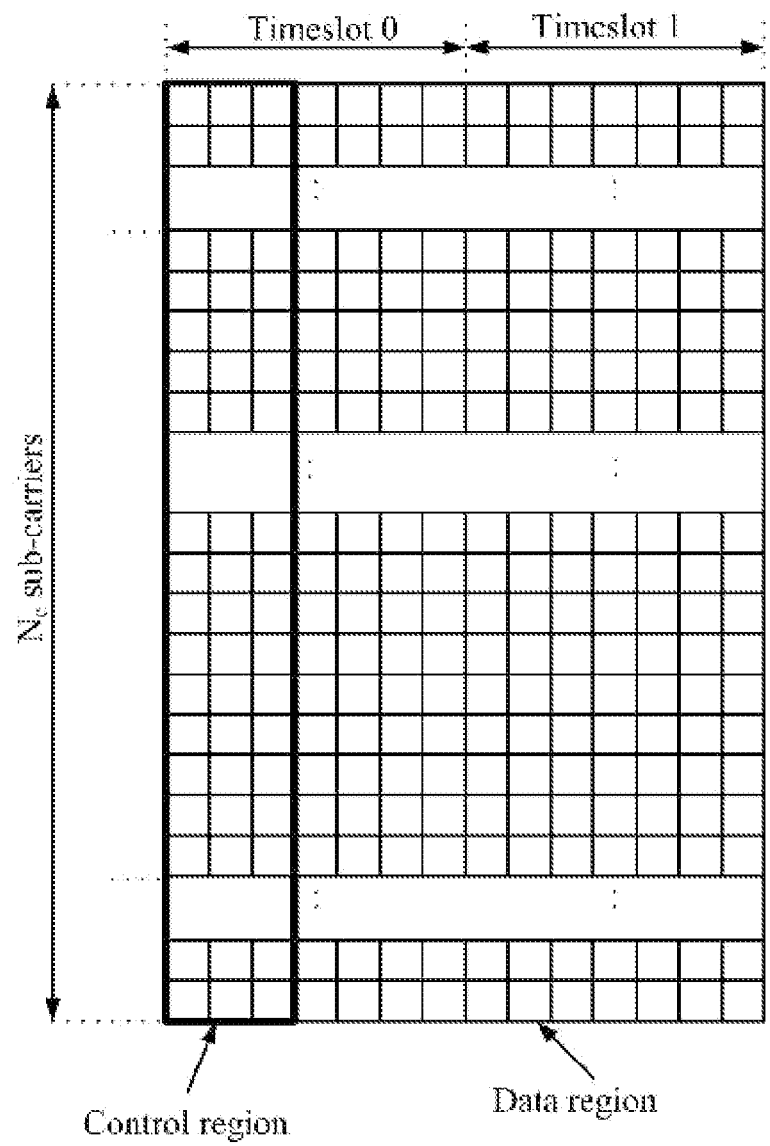
FIG. 1 illustrates a schematic diagram of the control region, which is arranged in the data region, in a downlink sub-frame in the prior art.
Figure 2:
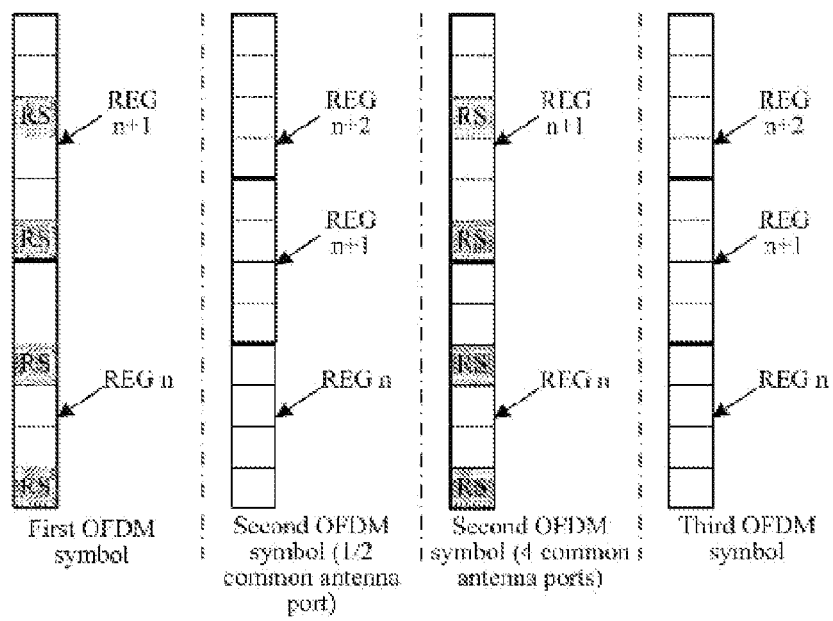
FIG. 2 illustrates a schematic diagram of the REG in the prior art.
Figure 3:
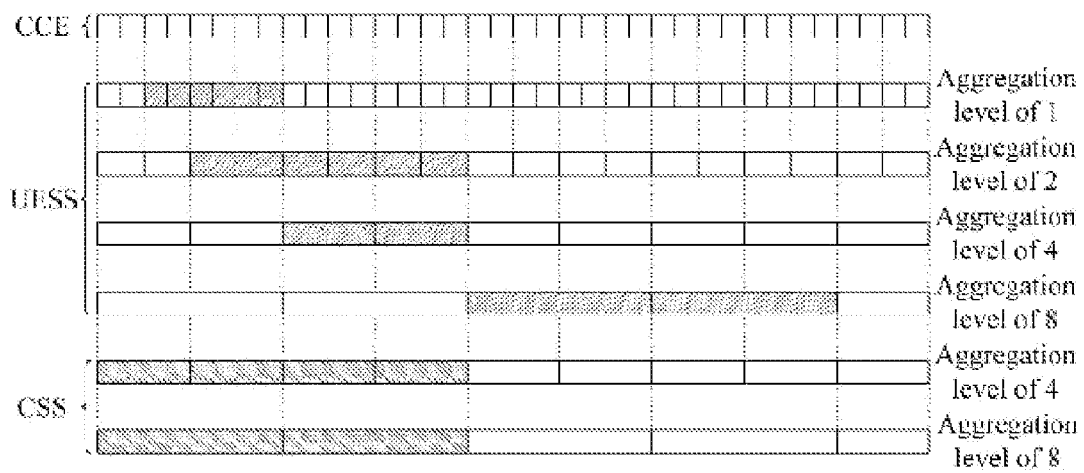
FIG. 3 illustrates a schematic diagram of PDCCH blind detection by a UE in a downlink sub-frame in the prior art.
Figure 4:
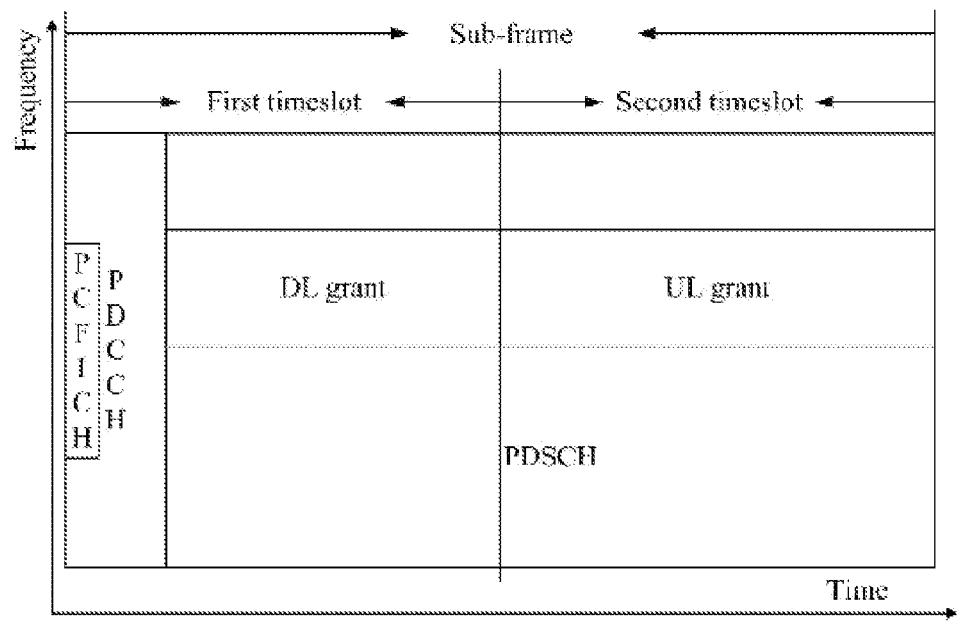
FIG. 4 illustrates a schematic diagram of R-PDCCH and PDSCH resources in the prior art.
Figure 5A:
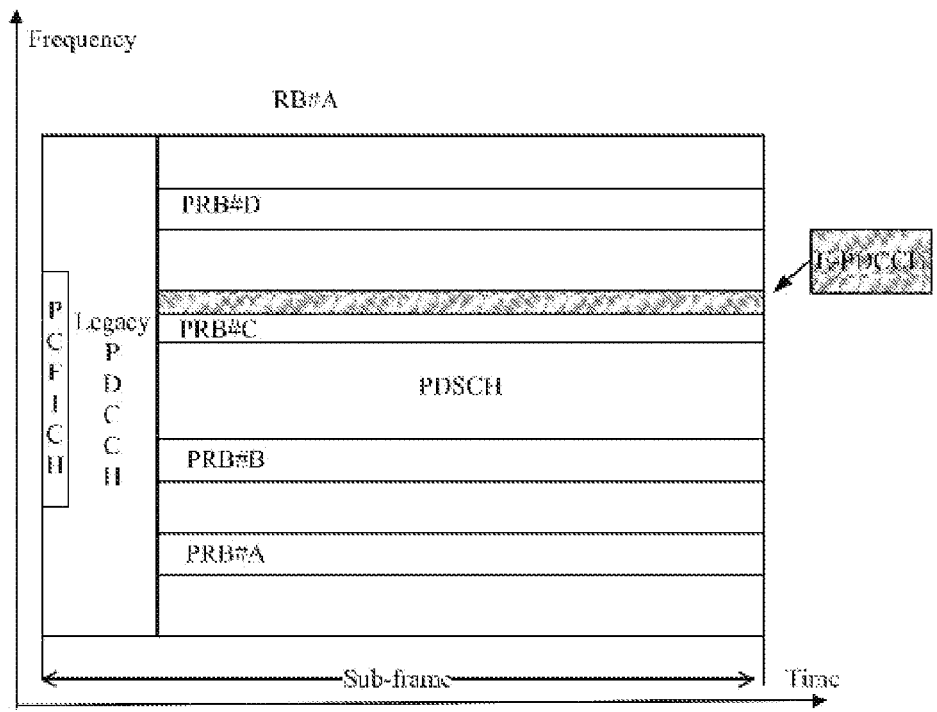
FIG. 5a and FIG. 5b illustrate schematic diagrams of localized and distributed transmission of E-PDCCHs according to embodiments of the invention respectively.
Figure 5B:
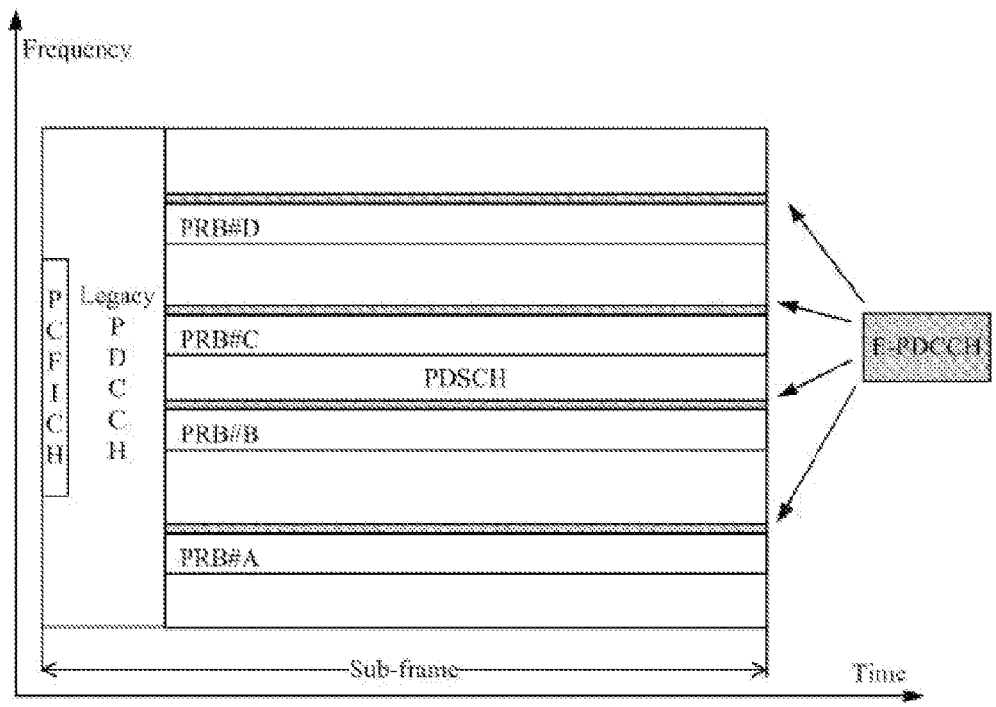

FIG. 5a and FIG. 5b illustrate examples of transmission for localized and distributed E-PDCCHs respectively, where resources in four PRB pairs are occupied by transmission for an distributed E-PDCCH candidate, which will be described in details below.

In order to address the problem of how to transmit downlink control information over E-PDCCHs in the localized transmission mode, an embodiment of the invention provides a first method for transmitting an E-PDCCH.

Figure 6:
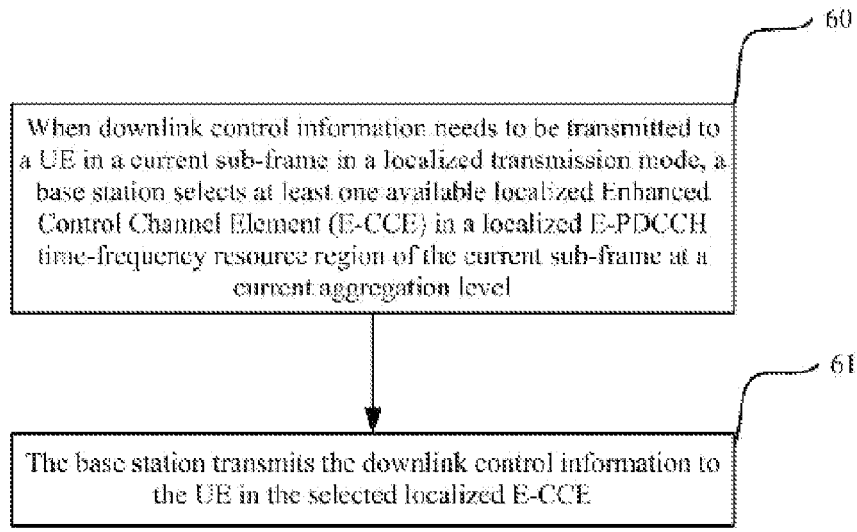
FIG. 6 illustrates a schematic flow chart of a method according to an embodiment of the invention.
Figure 10A:
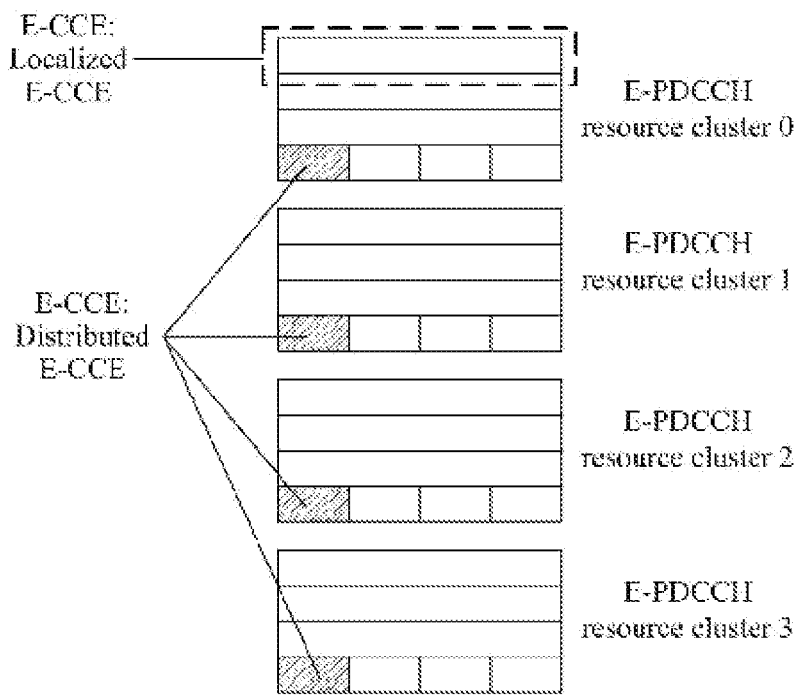
FIG. 10a illustrates a schematic diagram of E-CCEs according to an embodiment of the invention.

Referring to FIG. 6, a first method for transmitting an E-PDCCH according to an embodiment of the invention includes the following operations:

Operation 60: when downlink control information needs to be transmitted to a UE in a current sub-frame in a localized transmission mode, a base station selects at least one available localized Enhanced Control Channel Element (E-CCE) in a localized E-PDCCH time-frequency resource region of the current sub-frame at a current aggregation level; and Operation 61: the base station transmits the downlink control information to the UE in the selected localized E-CCE;

Particularly the localized E-PDCCH time-frequency resource region includes at least one E-PDCCH resource cluster, each of which consists of at least one Physical Resource Block (PRB) pair consecutive in frequency domain in the current sub-frame; and each E-PDCCH resource cluster includes at least one localized E-CCE, and each localized E-CCE is a set of a part of Resource Elements (REs) in a PRB pair, that is, a set of time-frequency resources occupied by a localized E-CCE can be a set consisting of resource of a part of REs selected from a PRB pair according to a predefined pattern, which can be a set consisting of an integer number of a part of E-REGs located in the same PRB pair, as illustrated in FIG. 10a, where a set of time-frequency resources occupied by an E-REG can be a set consisting of a part of REs selected from a PRB pair according to a predefined pattern, and the number of REs in the E-REG is less than the number of REs in the localized E-CCE.

Particularly in the operation 60, at least one available localized E-CCE can be selected in the localized E-PDCCH time-frequency resource region of the current sub-frame at the current aggregation level particularly by selecting an E-PDCCH resource cluster in the localized E-PDCCH time-frequency resource region of the current sub-frame; determining a localized E-PDCCH search space in the selected E-PDCCH resource cluster; and selecting L available localized E-CCEs in the determined localized E-PDCCH search space, where L represents the current aggregation level.

Figure 10B:
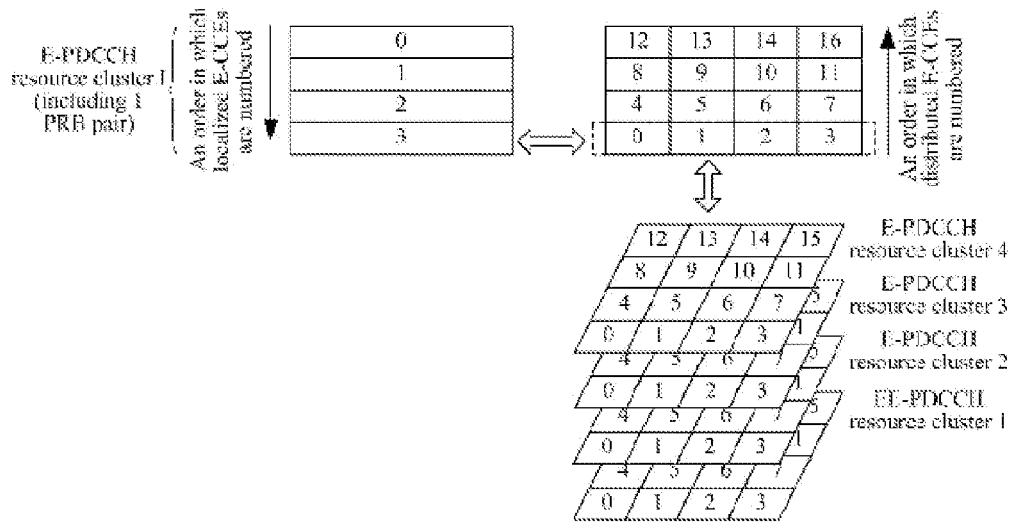
FIG. 10b illustrates a schematic diagram of numbering E-CCEs according to an embodiment of the invention.

Preferably localized E-CCEs in each E-PDCCH resource cluster are numbered sequentially starting with 0 in an order of time-frequency resources, as illustrated in FIG. 10b, where a starting location of the localized E-PDCCH search space is at a localized E-CCE numbered 0.

Correspondingly the localized E-PDCCH search space in the selected E-PDCCH resource cluster can be determined particularly as follows:

The serial numbers of the respective localized E-CCEs in the localized E-PDCCH search space in the selected E-PDCCH resource cluster are calculated in Equation 1 below:

$$(L \cdot m^{(n)} + i) \bmod N_{E\text{-}CCE,k}^{(n)};  \qquad \text{Equation 1:}$$

Where $N_{E\text{-}CCE,k}^{(n)}$ represents the number of localized E-CCEs in the E-PDCCH resource cluster n selected in the current sub-frame k; $i=0, L, L-1$ with L representing the current aggregation level; and $m^{(n)}=0, L, M^{(L,n)}-1$ with $M^{(L,n)}$ representing the number of localized E-PDCCH candidates, in the selected E-PDCCH resource cluster n, to be monitored by the UE at the aggregation level L; and The localized E-PDCCH search space in the selected E-PDCCH resource cluster consists of the localized E-CCEs corresponding to the respective calculated serial numbers.

Particularly $M^{(L,n)}=A/N'$, where A represents the total number of localized E-PDCCH candidates to be monitored by the UE at the aggregation level L, and N' represents the total number of E-PDCCH resource clusters in the localized E-PDCCH time-frequency resource region. The total number of localized E-PDCCH candidates to be monitored by the UE at the aggregation level L is decided according to a blind detection capacity of the UE.

Preferably before the base station transmits the data to the UE, the base station indicates location information of the localized E-PDCCH time-frequency resource region to the UE. For example, the base station indicates starting location information of the respective E-PDCCH resource clusters in the localized E-PDCCH time-frequency resource region (e.g., the serial numbers of first PRBs in the corresponding E-PDCCH resource clusters) respectively to the UE; or the base station indicates starting location information of one of the E-PDCCH resource clusters in the localized E-PDCCH time-frequency resource region (e.g., the serial number of the first PRB in the E-PDCCH resource cluster) to the UE.

Further to any one of the embodiments above in FIG. 6, preferably when the base station transmits the downlink control information to the UE in the selected localized E-CCE, the base station further determines a DMRS port corresponding to the selected localized E-CCE according to a correspondence relationship, between the localized E-CCE and the DMRS port, preset for the E-PDCCH resource cluster where the selected localized E-CCE is located and transmits a Reference Signal (RS) for demodulation to the UE via the determined DMRS port. The DMRS ports can include a DMRS port 7, a DMRS port 8, a DMRS port 9 and a DMRS port 10.

When there are a plurality of localized E-CCEs selected, one of DMRS ports corresponding to the selected plurality of localized E-CCEs is selected in Equation 3 below, and the RS for demodulation is transmitted to the UE via the selected DMRS port:

$$n_{port}=f(n_{eCCE}^{lowest}+\mathrm{mod}(RNTI,L'));\quad\quad\text{Equation 3:}$$

Where $n_{port}$ represents the index of a port, L' represents the number of localized E-CCEs occupied by localized E-PDCCHs in a PRB pair, $n_{eCCE}^{lowest}$ represents the serial number of the localized E-CCE with the lowest serial number in the current L' localized E-CCEs, and the function f( ) represents the index of a DMRS port corresponding to the serial number of a localized E-CCE, calculated in the expression bracketed in Equation 3, derived according to the correspondence relationship.

DMRS ports corresponding to localized E-CCEs in the (i+1)-th E-PDCCH resource cluster in the localized E-PDCCH time-frequency resource region result from cyclic shifting of DMRS ports corresponding to localized E-CCEs in the i-th E-PDCCH resource cluster, where i represents an integer ranging from 0 to N'-1 with N' representing the total number of E-PDCCH resource clusters in the localized E-PDCCH time-frequency resource region. For example, if DMRS ports corresponding to localized E-CCEs in the i-th E-PDCCH resource cluster are 7, 8, 9 and 10 respectively, then DMRS ports corresponding to localized E-CCEs in the (i+1)-th E-PDCCH resource cluster are 8, 9, 10 and 7 respectively; if DMRS ports corresponding to localized E-CCEs in the i-th E-PDCCH resource cluster are 8, 9, 10 and 7 respectively, then DMRS ports corresponding to localized E-CCEs in the (i+1)-th E-PDCCH resource cluster are 9, 10, 7 and 8 respectively; and so on.

In this method, the aggregation level can be 1 or 2 or 4 or 8.

Figure 7:
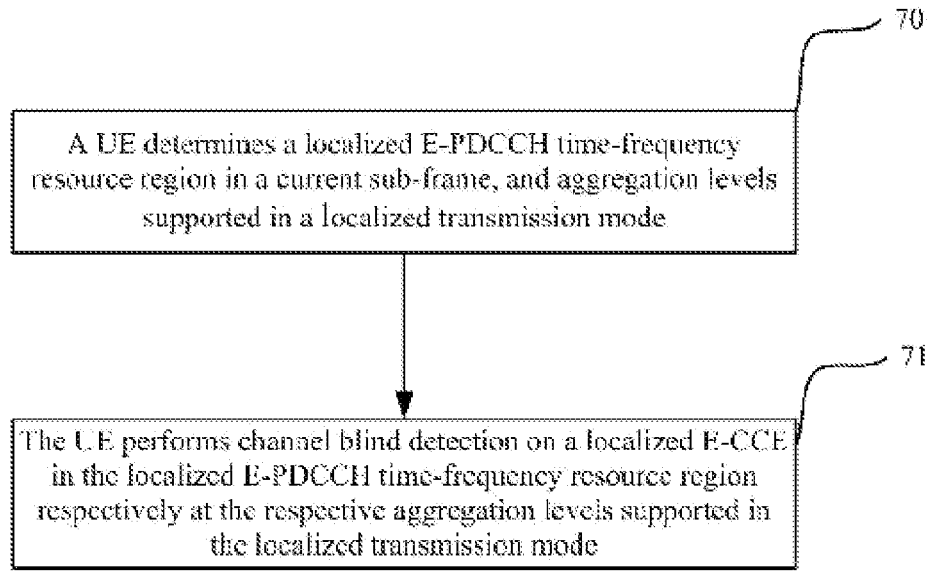
FIG. 7 illustrates a schematic flow chart of another method according to an embodiment of the invention.

In order to address the problem of how a UE detects an E-PDCCH in the first method above for transmitting an E-PDCCH, an embodiment of the invention provides a first method of detecting an E-PDCCH:

Referring to FIG. 7, a first method for detecting an E-PDCCH according to an embodiment of the invention includes the following operations:

Operation 70: a UE determines a localized E-PDCCH time-frequency resource region in a current sub-frame, and aggregation levels supported in a localized transmission mode; and Operation 71: the UE performs channel blind detection on a localized E-CCE in the localized E-PDCCH time-frequency resource region respectively at the respective aggregation levels supported in the localized transmission mode to obtain downlink control information;

Particularly the localized E-PDCCH time-frequency resource region includes at least one E-PDCCH resource cluster, each of which consists of at least one PRB pair consecutive in frequency domain in the current sub-frame; and each E-PDCCH resource cluster includes at least one localized E-CCE, and each localized E-CCE is a set of a part of REs in a PRB pair.

In the operation 71, the UE can perform channel blind detection on the localized E-CCE in the localized E-PDCCH time-frequency resource region respectively at the respective aggregation levels supported in the localized transmission mode particularly as follows:

The UE performs on each E-PDCCH resource cluster in the localized E-PDCCH time-frequency resource region of the current sub-frame the following operations of: determining a localized E-PDCCH search space in the current E-PDCCH resource cluster and performing channel blind detection on the localized E-CCE determined in the localized E-PDCCH search space respectively at the respective aggregation levels supported in the localized transmission mode.

Preferably localized E-CCEs in each E-PDCCH resource cluster are numbered sequentially starting with 0 in an order of time-frequency resources, as illustrated in FIG. 10a, where a starting location of the localized E-PDCCH search space is at a localized E-CCE numbered 0.

Correspondingly the UE can determine the localized E-PDCCH search space in the current E-PDCCH resource cluster particularly as follows:

The serial numbers of the respective localized E-CCEs in the localized E-PDCCH search space in the current E-PDCCH resource cluster is calculated in Equation 1 below:

$$(L\cdot m^{(n)}+i)\mathrm{mod}N_{E\text{-}CCE,k}^{(n)};\quad\quad\text{Equation 1:}$$

Where $N_{E\text{-}CCE,k}^{(n)}$ represents the serial number of localized E-CCEs in the current E-PDCCH resource cluster n in the current sub-frame k; i=0,L,L−1 with L representing the current aggregation level; and $m^{(n)}=0,L,M^{(L,n)}-1$ with $M^{(L,n)}$ representing the number of localized E-PDCCH candidates, in the current E-PDCCH resource cluster n, to be monitored by the UE at the aggregation level L; and The localized E-PDCCH search space in the current E-PDCCH resource cluster consists of the localized E-CCEs corresponding to the respective calculated numbers.

Particularly $M^{(L,n)}=A/N'$, where A represents the total number of localized E-PDCCH candidates to be monitored by the UE at the aggregation level L, and N' represents the total number of E-PDCCH resource clusters in the localized E-PDCCH time-frequency resource region.

Furthermore when channel blind detection is performed on the localized E-CCE determined in the localized E-PDCCH search space, a DMRS port corresponding to the localized E-CCE determined in the localized E-PDCCH search space is determined according to a correspondence relationship, between the localized E-CCE and the DMRS port, preset for the current E-PDCCH resource cluster and the localized E-CCE is demodulated using an RS transmitted via the determined DMRS port.

When there are a plurality of localized E-CCEs determined in the localized E-PDCCH search space, one of DMRS ports corresponding to the plurality of localized E-CCEs is selected in Equation 3 below, and the plurality of localized E-CCEs are demodulated using an RS transmitted via the selected DMRS port:

$$n_{port}=f(n_{eCCE}^{lowest}+\mathrm{mod}(RNTI,L'));\quad\quad\text{Equation 3:}$$

Where $n_{port}$ represents the index of a port, L' represents the number of localized E-CCEs occupied by localized E-PDCCHs in a PRB pair, $n_{eCCE}^{lowest}$ represents the serial number of the localized E-CCE with the lowest serial number in the current L' localized E-CCEs, and the function f( ) represents the index of a DMRS port corresponding to the serial number of a localized E-CCE, calculated in the expression bracketed in Equation 3, derived according to the correspondence relationship.

Preferably DMRS ports corresponding to localized E-CCEs in the (i+1)-th E-PDCCH resource cluster in the localized E-PDCCH time-frequency resource region result from cyclic shifting of DMRS ports corresponding to localized E-CCEs in the i-th E-PDCCH resource cluster, where i represents an integer ranging from 0 to N'−1 with N' representing the total number of E-PDCCH resource clusters in the localized E-PDCCH time-frequency resource region.

Details thereof are as follows:

Channel blind detection is performed above starting from the localized E-CCE with the lowest serial number in the determined localized E-PDCCH search space respectively at the respective aggregation levels supported in the localized transmission mode particularly as follows:

The following operations are performed at the respective aggregation levels supported in the localized transmission mode:

a. L localized E-CCEs are selected starting with the localized E-CCE with the lowest number in the determined localized E-PDCCH search space, where L represents the current aggregation level; and b. The selected L localized E-CCEs are demodulated using a Reference Signal (RS) transmitted via a DMRS port corresponding to one of the L localized E-CCEs, and it is judged whether information resulting from the demodulation is scrambled using a Cell-Radio network Temporary Identifier (C-RNTI) corresponding to the UE, and if so, the information resulting from the demodulation is determined as downlink control information for the UE; otherwise, L localized E-CCEs are further selected, and the operation b is repeated. Here the DMRS port corresponding to one of the localized E-CCEs is determined according to the preset correspondence relationship between the localized E-CCE and the DMRS port.

Particularly with L more than 1, the selected L localized E-CCEs are demodulated using the RS transmitted via the DMRS port corresponding to one of the L localized E-CCEs as follows:

The DMRS port corresponding to the RS used for demodulating the L localized E-CCEs is determined in Equation 3 below, and the L localized E-CCEs are demodulated using the RS transmitted via the determined DMRS port:

$$n_{port} = f(n_{eCCE}^{lowest} + \mathrm{mod}(RNTI, L')); \quad \text{Equation 3:}$$

Where $n_{port}$ represents the index of a port, L' represents the number of localized E-CCEs occupied by localized E-PDCCHs in a PRB pair, $n_{eCCE}^{lowest}$ represents the serial number of the localized E-CCE with the lowest serial number in the current L' localized E-CCEs, and the function f( ) represents the index of a DMRS port corresponding to the serial number of a localized E-CCE, calculated in the expression bracketed in Equation 3, derived according to the preset correspondence relationship between the localized E-CCE and the DMRS port.

Preferably in the operation 70, the UE can determine the localized E-PDCCH time-frequency resource region in the current sub-frame according to location information of the localized E-PDCCH time-frequency resource region pre-indicated by the base station. Particularly when the location information includes starting location information of the respective E-PDCCH resource clusters in the localized E-PDCCH time-frequency resource region, for each E-PDCCH resource cluster, the UE determines the location of the E-PDCCH resource cluster from the starting location information of the E-PDCCH resource cluster and the number of PRB pairs in the E-PDCCH resource cluster; or when the location information includes starting location information of one of the E-PDCCH resource clusters in the localized E-PDCCH time-frequency resource region, the UE determines the location of the E-PDCCH resource cluster from the starting location information of the E-PDCCH resource cluster and the number of PRB pairs in the E-PDCCH resource cluster and determines the locations of the other E-PDCCH resource clusters from the starting location information of the E-PDCCH resource cluster and information of interval in frequency domain between the different E-PDCCH resource clusters, where the information of interval in frequency domain can be notified by the base station to the UE or can be prescribed; and here the UE can particularly determine a starting PRB serial number to characterize the location of the i-th E-PDCCH resource cluster in the equation of $A_i = (N0 + i*k) \bmod L''$, where N0 represents the serial number of a first PRB in an E-PDCCH resource cluster indicated by the base station, $k = \mathrm{floor}(L''/N)$, N represents the total number of E-PDCCH resource clusters, and L'' represents the number of PRBs in the system bandwidth.

In this method, the aggregation level supported in the localized transmission mode includes one or any combination of 1, 2, 4 and 8.

In order to address the problem of how to transmit downlink control information over E-PDCCHs in the distributed transmission mode, an embodiment of the invention provides a second method for transmitting an E-PDCCH.

Figure 8:
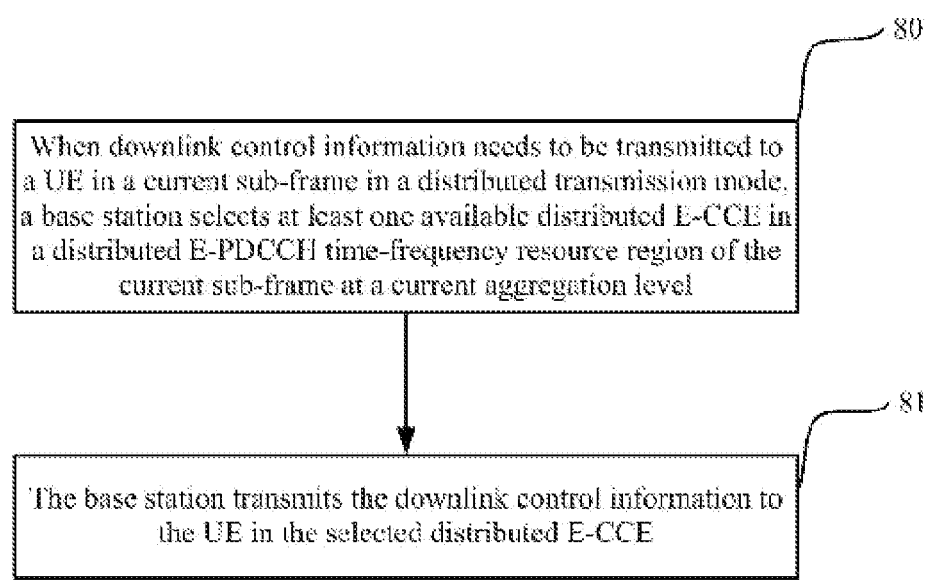
FIG. 8 illustrates a schematic flow chart of still another method according to an embodiment of the invention.

Referring to FIG. 8, a second method for transmitting an E-PDCCH according to an embodiment of the invention includes the following operations:

Operation 80: when downlink control information needs to be transmitted to a UE in a current sub-frame in a distributed transmission mode, a base station selects at least one available distributed E-CCE in a distributed E-PDCCH time-frequency resource region of the current sub-frame at a current aggregation level; and Operation 81: the base station transmits the downlink control information to the UE in the selected distributed E-CCE;

Particularly the distributed E-PDCCH time-frequency resource region includes N E-PDCCH resource clusters, where N represents an integer no less than 2; each E-PDCCH resource cluster consists of at least one PRB pair consecutive in frequency domain in the current sub-frame; and the N E-PDCCH resource clusters include at least one distributed E-CCE, and each distributed E-CCE is a set of a part of E-REGs in at least two of the N E-PDCCH resource clusters, as illustrated in FIG. 10a. Each E-REG is a set of a part of REs in a PRB pair. That is, a set of time-frequency resources occupied by a distributed E-CCE can be a set consisting of a part of E-REGs selected from at least two E-PDCCH resource clusters according to a predefined pattern. A set of time-frequency resources occupied by an E-REG can be a set consisting of a part of REs selected from a PRB pair according to a predefined pattern, where the number of REs in the E-REG is less than the number of REs in a localized E-CCE.

In the operation 80, at least one available distributed E-CCE can be selected in the distributed E-PDCCH time-frequency resource region of the current sub-frame at the current aggregation level particularly by determining a distributed E-PDCCH search space in the N E-PDCCH resource clusters; and selecting L available distributed E-CCEs in the determined distributed E-PDCCH search space, where L represents a value corresponding to the current aggregation level.

Preferably the distributed E-CCEs in the N E-PDCCH resource clusters are numbered sequentially starting with 0 in an order of time-frequency resource; and the distributed E-CCEs are numbered in an opposite order to an order in which localized E-CCEs are numbered, where the opposite order of numbering refers to the serial number of a distributed E-CCE including an E-REG located in a localized E-CCE with a larger serial number is lower. A starting location of the distributed E-PDCCH search space is at a distributed E-CCE numbered 0.

The distributed E-CCEs are numbered in the opposite order to the order in which the localized E-CCEs are numbered, for example, as illustrated in FIG. 10b, where a part of E-REG resources of a localized E-CCE with the highest serial number in an E-PDCCH resource cluster is occupied by a distributed E-CCE numbered 0. Taking a PRB pair including four localized E-CCEs as an example, if there is an ordering of {0,1,2,3} in a PRB pair in a localized E-CCE, then E-CCE resources occupied by localized E-PD-CCH candidates can start with the serial number of 0. E-REG resources occupied by distributed E-PDCCH candidates start with a time-frequency resource of the localized E-CCE numbered 3, thus occupying the resources in the PRB pair in an order opposite (a reverse order) to that used for the localized E-PDCCH candidates. The example in the figure is a localized E-CCE including four E-REGs.

Correspondingly the base station can determine the distributed E-PDCCH search space in the N E-PDCCH resource clusters particularly as follows:

The serial numbers of the respective distributed E-CCEs in the distributed E-PDCCH search space in the N E-PD-CCH resource clusters are calculated in Equation 2 below:

$$(L \cdot m + i) \bmod N_{E\text{-}CCE,k}^{(all)};$$ Equation 2:

Where $N_{E\text{-}CCE,k}^{(all)}$ represents the number of distributed E-CCEs in the N E-PDCCH resource clusters in the current sub-frame k; i=0,L,L−1 with L representing the current aggregation level; and m=0,L,$M^{(L)}$−1 with $M^{(L)}$ representing the number of distributed E-PDCCH candidates to be monitored by the UE at the aggregation level L; and The distributed E-PDCCH search space in the N E-PD-CCH resource clusters consists of the distributed E-CCEs corresponding to the respective calculated serial numbers.

Further to any one of the embodiments above in FIG. 8, preferably when the base station transmits the downlink control information to the UE in the selected distributed E-CCE, the base station further determines a DMRS port corresponding to each E-REG in the selected distributed E-CCE, where the DMRS port corresponding to each E-REG is the same as a DMRS port corresponding to a localized E-CCE where the E-REG is located; and transmits an RS for demodulation to the UE via the determined DMRS port. When a localized E-PDCCH time-frequency resource region overlaps with the distributed E-PDCCH time-frequency resource region, the E-PDCCH resource clusters in the region may include both localized E-CCEs and distributed E-CCEs.

Particularly DMRS ports corresponding to localized E-CCEs in the (i+1)-th one of the N E-PDCCH resource clusters result from cyclic shifting of DMRS ports corresponding to localized E-CCEs in the i-th E-PDCCH resource cluster, where i represents an integer ranging from 0 to N−1, that is, a DMRS port corresponding to each E-REG in the i-th one of the N E-PDCCH resource clusters is determined as follows, where i represents an integer ranging from 0 to N−1:

The DMRS ports corresponding to the respective localized E-CCEs in the (i+1)-th E-PDCCH resource cluster are determined respectively according to the order in which the localized E-CCEs are numbered;

The port serial number of the respective determined DMRS ports are shifted cyclically for a number i of times resulting in the port serial numbers of new DMRS ports corresponding to the respective localized E-CCEs, for example, the port serial numbers 7, 8, 9 and 10 respectively of the respective DMRS ports are shifted cyclically once resulting in the port serial numbers 8, 9, 10 and 7 of new DMRS ports, shifted cyclically twice resulting in the port serial numbers 9, 10, 7 and 8 of another new DMRS ports, shifted cyclically for three times resulting in the port serial numbers 10, 7, 8 and 9 of another new DMRS ports, and so on; and For each E-REG in the i-th E-PDCCH resource cluster, the new DMRS port corresponding to the localized E-CCE where the E-REG is located is determined as the DMRS port corresponding to the E-REG Further to any one of the embodiments above in FIG. 8, preferably before the base station transmits the data to the UE, the base station indicates location information of the distributed E-PDCCH time-frequency resource region to the UE.

Particularly the base station can indicate the location information of the distributed E-PDCCH time-frequency resource region to the UE particularly as follows:

The base station indicates starting location information of the N respective E-PDCCH resource clusters (e.g., the serial numbers of first PRBs in the corresponding E-PDCCH resource clusters) respectively to the UE; or The base station indicates starting location information of one of the N E-PDCCH resource clusters (e.g., the serial number of a first PRB in the E-PDCCH resource cluster) to the UE; or The base station indicates a location offset of the distributed E-PDCCH time-frequency resource region relative to a localized E-PDCCH time-frequency resource region to the UE, where the location offset can be the number of PRB pairs or can be the number of localized E-CCEs.

Furthermore the base station further indicates information of interval in frequency domain between the different E-PD-CCH resource clusters to the UE together with the starting location information of one of the N E-PDCCH resource clusters.

In this method, the aggregation level can be 1 or 2 or 4 or 8.

Figure 9:
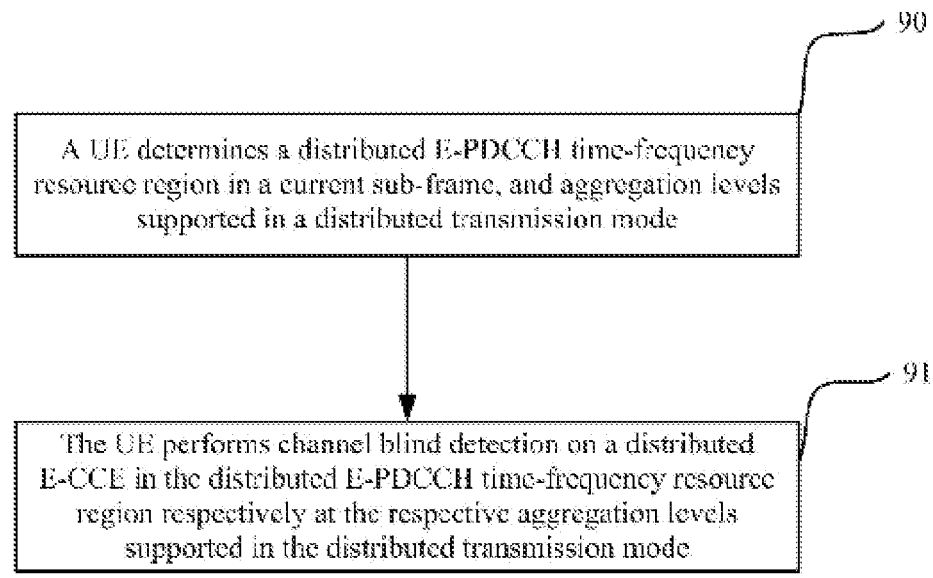
FIG. 9 illustrates a schematic flow chart of a further method according to an embodiment of the invention.

In order to address the problem of how a UE detects an E-PDCCH in the second method above for transmitting an E-PDCCH, an embodiment of the invention provides a second method of detecting an E-PDCCH:

Referring to FIG. 9, a second method for detecting an E-PDCCH according to an embodiment of the invention includes the following operations:

Operation 90: a UE determines a distributed E-PDCCH time-frequency resource region in a current sub-frame, and aggregation levels supported in a distributed transmission mode; and Operation 91: the UE performs channel blind detection on a distributed E-CCE in the distributed E-PDCCH time-frequency resource region respectively at the respective aggregation levels supported in the distributed transmission mode to obtain downlink control information;

Particularly the distributed E-PDCCH time-frequency resource region includes N E-PDCCH resource clusters, where N represents an integer no less than 2; each E-PD-CCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

In the operation 91, the UE can perform channel blind detection on the distributed E-CCE in the distributed E-PD- CCH time-frequency resource region respectively at the respective aggregation levels supported in the distributed transmission mode particularly by determining a distributed E-PDCCH search space in the N E-PDCCH resource clusters; and performing channel blind detection on the distributed E-CCE determined in the distributed E-PDCCH search space respectively at the respective aggregation levels supported in the distributed transmission mode.

Preferably the distributed E-CCEs in the N E-PDCCH resource clusters are numbered sequentially starting with 0 in an order of time-frequency resource; and the distributed E-CCEs are numbered in an opposite order to an order in which localized E-CCEs are numbered, where the opposite order of numbering refers to the serial number of a distributed E-CCE including an E-REG located in a localized E-CCE with a larger serial number is lower. A starting location of the distributed E-PDCCH search space is at a distributed E-CCE numbered 0.

The distributed E-CCEs are numbered in the opposite order to the order in which the localized E-CCEs are numbered, for example, as illustrated in FIG. 10b, where a part of E-REG resources of a localized E-CCE with the highest serial number in an E-PDCCH resource cluster is occupied by a distributed E-CCE numbered 0. Taking a PRB pair including four localized E-CCEs as an example, if there is an ordering of {0,1,2,3} in a PRB pair in a localized E-CCE, then E-CCE resources occupied by localized E-PDCCH candidates can start with the serial number of 0. E-REG resources occupied by distributed E-PDCCH candidates start with a time-frequency resource of the localized E-CCE numbered 3, thus occupying the resources in the PRB pair in an order opposite (a reverse order) to that used for the localized E-PDCCH candidates. The example in the figure is a localized E-CCE including four E-REGs.

Since the UE performs blind detection in an order of the serial numbers of the E-CCEs, and the distributed E-CCEs are numbered in the opposite order to the order in which the localized E-CCEs are numbered, the UE also performs blind detection on the localized E-CCEs in an opposite order to an order in which blind detection is performed on the distributed E-CCEs.

Correspondingly the UE can determine the distributed E-PDCCH search space in the N E-PDCCH resource clusters particularly as follows:

The serial numbers of the respective distributed E-CCEs in the distributed E-PDCCH search space in the N E-PDCCH resource clusters are calculated in Equation 2 below:

$$(L \cdot m + i) \bmod N_{E\text{-}CCE,k}^{(all)};\qquad\text{Equation 2:}$$

Where $N_{E\text{-}CCE,k}^{(all)}$ represents the number of distributed E-CCEs in the N E-PDCCH resource clusters in the current sub-frame k; i=0,L,L−1 with L representing the current aggregation level; and m=0,L,$M^{(L)}$−1 with $M^{(L)}$ representing the number of distributed E-PDCCH candidates to be monitored by the UE at the aggregation level L; and The distributed E-PDCCH search space in the N E-PDCCH resource clusters consists of the distributed E-CCEs corresponding to the respective calculated serial numbers.

When channel blind detection is performed on the distributed E-CCE determined in the distributed E-PDCCH search space, the UE determines a DMRS port corresponding to each E-REG in the distributed E-CCE determined in the distributed E-PDCCH search space, where the DMRS port corresponding to each E-REG is the same as a DMRS port corresponding to a localized E-CCE where the E-REG is located; and demodulates the distributed E-CCE using an RS transmitted via the determined DMRS port.

Particularly DMRS ports corresponding to localized E-CCEs in the (i+1)-th one of the N E-PDCCH resource clusters result from cyclic shifting of DMRS ports corresponding to localized E-CCEs in the i-th E-PDCCH resource cluster, where i represents an integer ranging from 0 to N−1.

Details thereof are as follows:

Channel blind detection is performed starting from the distributed E-CCE with the lowest serial number in the distributed E-PDCCH search space respectively at the respective aggregation levels supported in the distributed transmission mode particularly as follows:

The following operations are performed at the respective aggregation levels supported in the distributed transmission mode:

a. L localized E-CCEs are selected starting with the distributed E-CCE with the lowest number in the distributed E-PDCCH search space, where L represents the current aggregation level;

b. For each E-REG in the L selected distributed E-CCEs, the E-REG is demodulated using an RS transmitted via a DMRS port corresponding to the E-REG; and E-REGs in different E-PDCCH resource clusters correspond to different DMRS ports; and c. It is judged whether information resulting from the demodulation is scrambled using a C-RNTI corresponding to the UE, and if so, then the information resulting from the demodulation is determined as downlink control information for the UE; otherwise, L localized E-CCEs are further selected, and the operation b is repeated.

Particularly a DMRS port corresponding to each E-REG in the i-th one of the N E-PDCCH resource clusters is determined as follows, where i represents an integer ranging from 0 to N−1:

The DMRS ports corresponding to the respective localized E-CCEs in the i-th E-PDCCH resource cluster are determined respectively in the order in which the localized E-CCEs are numbered;

The port serial number of the respective determined DMRS ports are shifted cyclically for a number i of times resulting in the port serial numbers of new DMRS ports corresponding to the respective localized E-CCEs; and For each E-REG in the i-th E-PDCCH resource cluster, the new DMRS port corresponding to the localized E-CCE where the E-REG is located is determined as the DMRS port corresponding to the E-REG.

Preferably in the operation 90, the UE can determine the distributed E-PDCCH time-frequency resource region in the current sub-frame according to location information of the distributed E-PDCCH time-frequency resource region pre-indicated by the base station.

Particularly the UE can determine the distributed E-PDCCH time-frequency resource region in the current sub-frame according to the location information of the distributed E-PDCCH time-frequency resource region pre-indicated by the base station particularly as follows:

When the location information includes starting location information of the N respective E-PDCCH resource clusters, the locations of the corresponding E-PDCCH resource clusters are determined from the respective starting location information, and particularly for each E-PDCCH resource cluster, the UE determines the location of the E-PDCCH resource cluster from the starting location information of the E-PDCCH resource cluster and the number of PRB pairs in the E-PDCCH resource cluster; or When the location information includes starting location information (e.g., the serial number of a first PRB) of one of the N E-PDCCH resource clusters, the UE determines the location of the E-PDCCH resource cluster from the starting location information and the number of PRB pairs in the E-PDCCH resource cluster, and determines the locations of the other (N−1) E-PDCCH resource clusters from the starting location information and information of interval in frequency domain between the different E-PDCCH resource clusters, where the UE can obtain the information of interval in frequency domain between the different E-PDCCH resource clusters from signaling pre-transmitted by the base station or determine the information of interval in frequency domain between the different E-PDCCH resource clusters as prescribed with the base station. Here the UE can particularly determine a starting PRB serial number to characterize the location of the i-th E-PDCCH resource cluster in the equation of $A_i$=(N0+i*k) mod L", where N0 represents the serial number of a first PRB in an E-PDCCH resource cluster indicated by the base station, k=floor(L"/N), N represents the total number of E-PDCCH resource clusters, and L" represents the number of PRBs in the system bandwidth; or When the location information includes a location offset of the distributed E-PDCCH time-frequency resource region relative to a localized E-PDCCH time-frequency resource region, the location of the distributed E-PDCCH time-frequency resource region is determined from the location of the localized E-PDCCH time-frequency resource region and the location offset, for example, when the location offset is the number of PRB pairs, the location of the localized E-PDCCH time-frequency resource region is offset upward or downward in frequency domain by the number of PRB pairs resulting in the location of the distributed E-PDCCH time-frequency resource region; and in another example, when the location offset is the number of localized E-CCEs, the location of the localized E-PDCCH time-frequency resource region is offset upward or downward in frequency domain by the number of localized E-CCEs resulting in the location of the distributed E-PDCCH time-frequency resource region.

In this method, the aggregation level supported in the distributed transmission mode includes one or any combination of 1, 2, 4 and 8.

It shall be noted that when the base station transmits E-PDCCHs only in the localized transmission mode, the base station only need to perform the flow illustrated in FIG. 6, and the UE only needs to perform detection on localized E-PDCCHs, that is, the UE performs the flow illustrated in FIG. 7;

When the base station transmits E-PDCCHs only in the distributed transmission mode, the base station only need to perform the flow illustrated in FIG. 8, and the UE only needs to perform detection on distributed E-PDCCHs, that is, the UE performs the flow illustrated in FIG. 9; and When the base station transmits E-PDCCHs both in the localized transmission mode and in the distributed transmission mode, the base station can perform the flow illustrated in FIG. 6 and the flow illustrated in FIG. 8, that is, the base station can transmit downlink control information to one part of UEs in the flow illustrated in FIG. 6 and transmit downlink control information to another part of UEs in the flow illustrated in FIG. 8; and the UE also needs to perform detection on localized E-PDCCHs and distributed E-PDCCHs, that is, the UE performs detection on localized E-PDCCHs in the flow illustrated in FIG. 7 and performs detection on distributed E-PDCCH in the flow illustrated in FIG. 9. In this case, the E-PDCCH time-frequency resource region may or may not overlap with the distributed E-PDCCH time-frequency resource region.

The invention will be described below in connection with particular embodiments thereof.

First Embodiment

In this embodiment, a localized E-PDCCH time-frequency resource region overlaps with a distributed E-PDCCH time-frequency resource region.

Figure 10C:
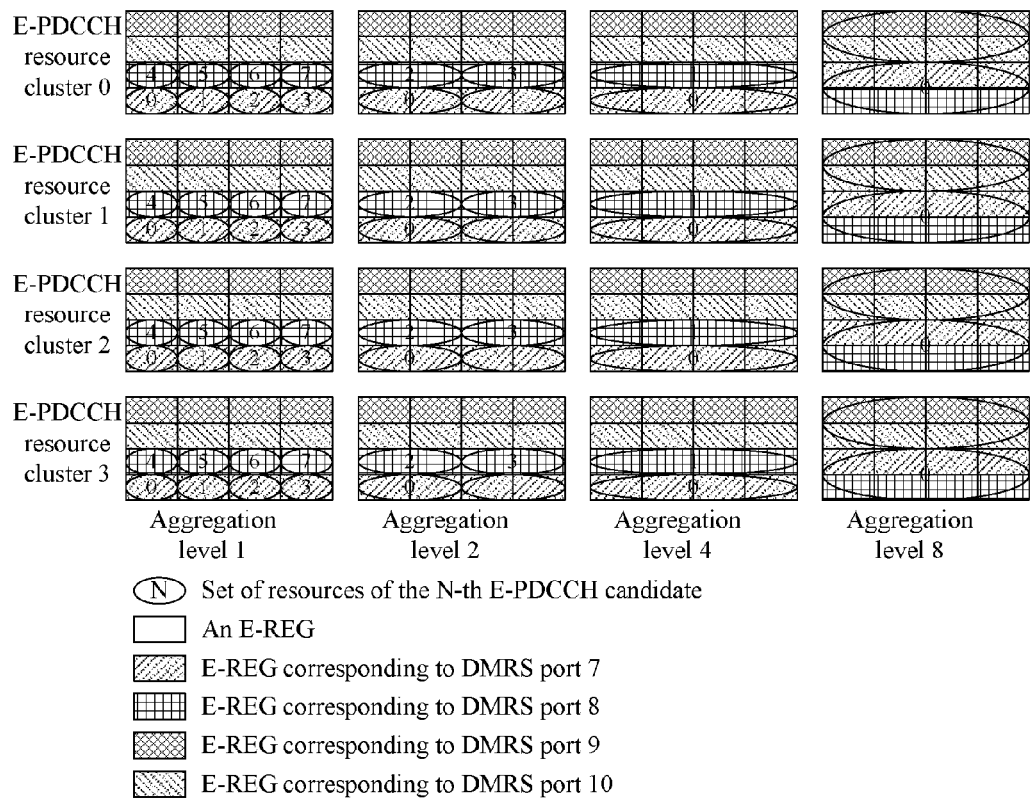
FIG. 10c and FIG. 10d illustrate schematic diagrams of resource mapping according to a first embodiment of the invention.
Figure 10D:
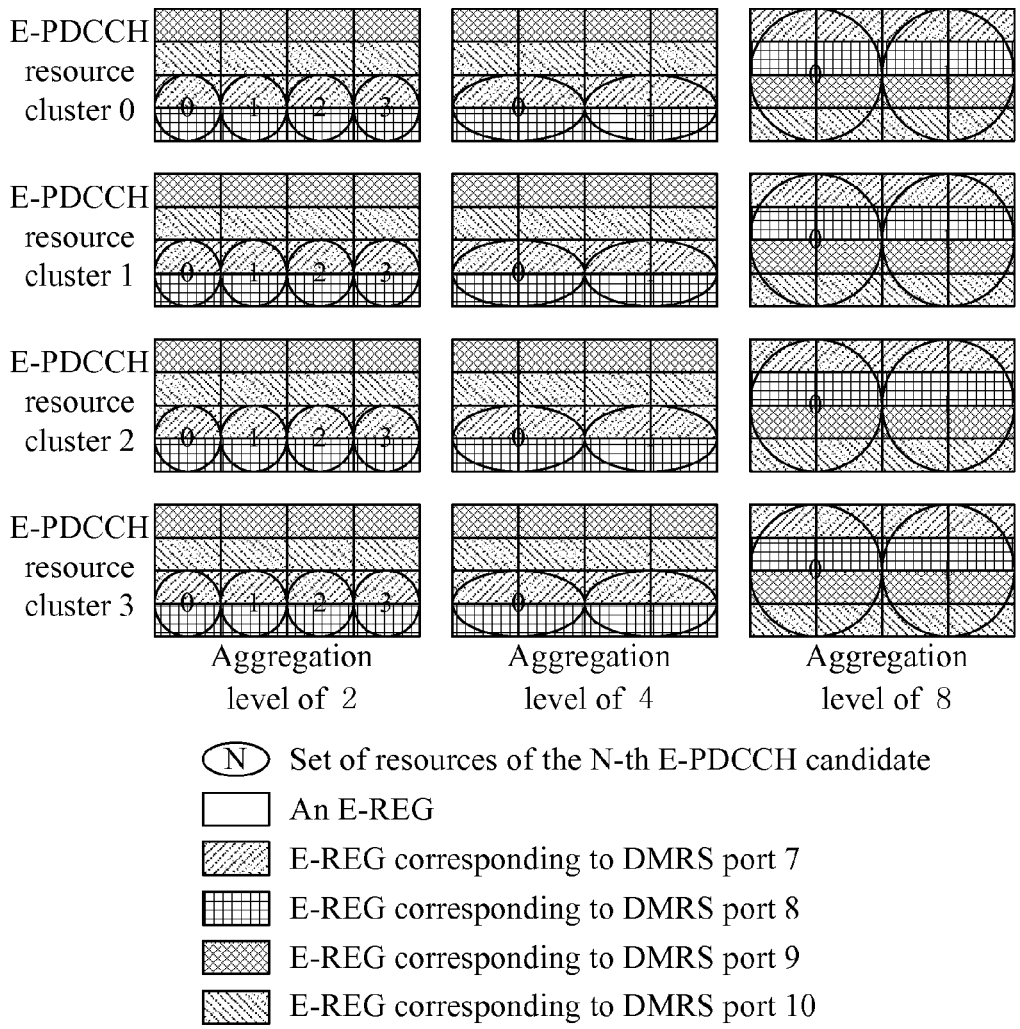

For an E-PDCCH candidate at a high aggregation level, there will be more than one E-REG resource in a PRB pair, where there are the following several schemes to select an E-REG resource to be occupied:

In a first scheme, firstly E-REG resources in the same localized E-CCE are selected to be occupied, and then resources of a next localized E-CCE are allocated in the event that all the resources in the localized E-CCE are occupied, as illustrated in FIG. 10c;

In a second scheme, firstly E-REG resources in more than one localized E-CCE are selected to be occupied, as illustrated in FIG. 10d; and In a third scheme, any combination of the first scheme and the second scheme is performed at different aggregation levels FIG. 10c illustrates a set of time-frequency resources occupied by distributed E-PDCCH candidates at the aggregation levels of {1,2,4,8}. FIG. 10d illustrates a set of time-frequency resources occupied by distributed E-PDCCH candidates at the aggregation levels of {2,4,8}.

Particularly there are four E-PDCCH clusters, each of which includes a PRB pair; and a PRB can be divided into resources of four distributed E-CEEs, each of which consists of four E-REGs, that is, a PRB pair can be divided into 16 E-REGs.

Particularly time-frequency resources, in a PRB pair, which can be occupied by distributed E-PDCCHs are decided by a blind detection capacity of the UE. If the blind detection capacity of the UE is not constrained, then the UE can occupy E-REG resources at any location in a PRB pair, and FIG. 10c and FIG. 10d illustrate the corresponding numbers {8,4,2,2} of E-PDCCH candidates at the aggregation levels of {1,2,4,8} supported in the distributed transmission mode.

Second Embodiment

In this embodiment, a localized E-PDCCH time-frequency resource region overlaps with a distributed E-PDCCH time-frequency resource region. Further to the first embodiment, an example in which there are localized E-PDCCHs and distributed E-PDCCHs multiplexed in the same PRB pair is given in this embodiment, where resources occupied by the localized E-PDCCHs and the distributed E-PDCCHs are decided by the numbers of E-PDCCH candidates to be monitored by the UE at the respective aggregation levels supported in the localized and distributed transmission modes. FIG. 10e to FIG. 10h illustrate schematic diagrams of resources occupied by localized E-PDCCHs and distributed E-PDCCHs at the aggregation level of 1 in four scenarios taking an E-PDCCH cluster as an example.

Figure 10E:
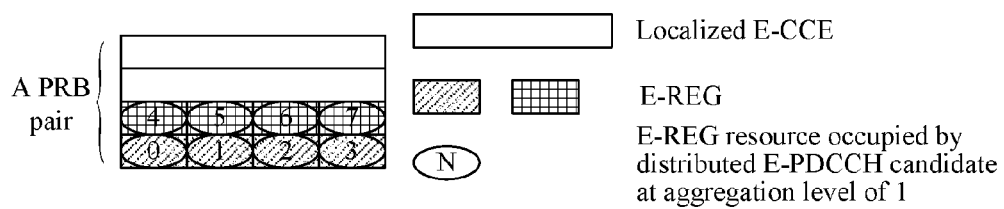
FIG. 10e to FIG. 10h illustrate schematic diagrams of resource mapping according to a second embodiment of the invention.
Figure 10F:
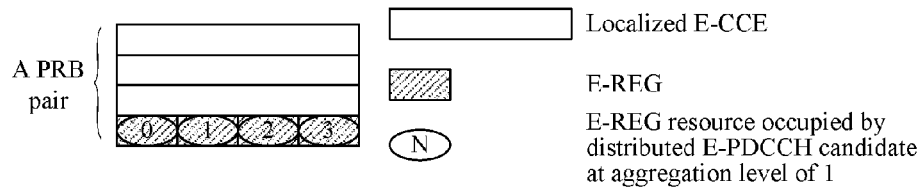
Figure 10G:
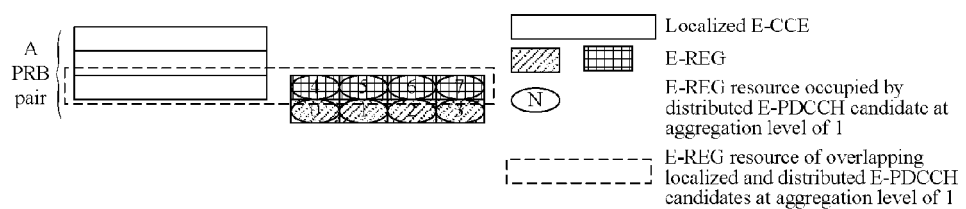
Figure 10H:
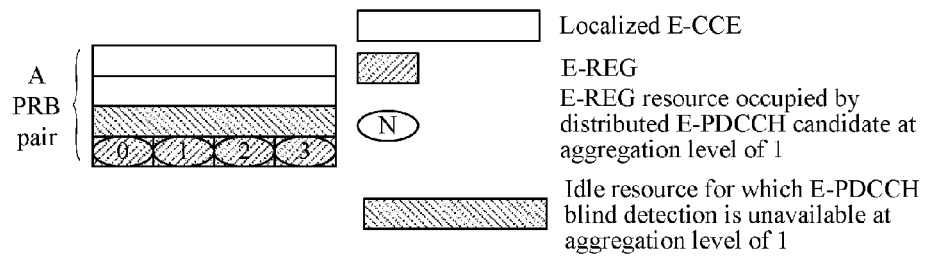

In a scenario A, the number of localized E-PDCCH candidates to be monitored by the UE at the aggregation level of 1 is 8, and if the number of E-PDCCH clusters is 4, then the number of localized E-PDCCH candidates to be monitored in an E-PDCCH cluster is 8/4=2, and the number of distributed E-PDCCH candidates at the aggregation level of 1 is 8, as illustrated in FIG. 10e;

In a scenario B, the number of localized E-PDCCH candidates to be monitored by the UE at the aggregation level of 1 is 12, and if the number of E-PDCCH clusters is 4, then the number of localized E-PDCCH candidates to be monitored in an E-PDCCH cluster is 12/4=3, and the number of distributed E-PDCCH candidates at the aggregation level of 1 is 4, as illustrated in FIG. 10*f*;

In a scenario C, the number of localized E-PDCCH candidates to be monitored by the UE at the aggregation level of 1 is 12, and if the number of E-PDCCH clusters is 4, then the number of localized E-PDCCH candidates to be monitored in an E-PDCCH cluster is 12/4=3, and the number of distributed E-PDCCH candidates at the aggregation level of 1 is 8; and as can be apparent, what is boxed in dotted lines represents an area where the localized E-PDCCHs overlap with the distributed E-PDCCHs, and only one but not both of the localized E-PDCCHs and the distributed E-PDCCHs may exist in this area; and In a scenario D, the number of localized E-PDCCH candidates to be monitored by the UE at the aggregation level of 1 is 8, and if the number of E-PDCCH clusters is 4, then the number of localized E-PDCCH candidates to be monitored in an E-PDCCH cluster is 8/4=2, and the number of distributed E-PDCCH candidates at the aggregation level of 1 is 4; and as can be apparent, resources boxed in solid lines are idle resources for which no blind detection is available at the aggregation level of 1.

Third Embodiment

Figure 10I:
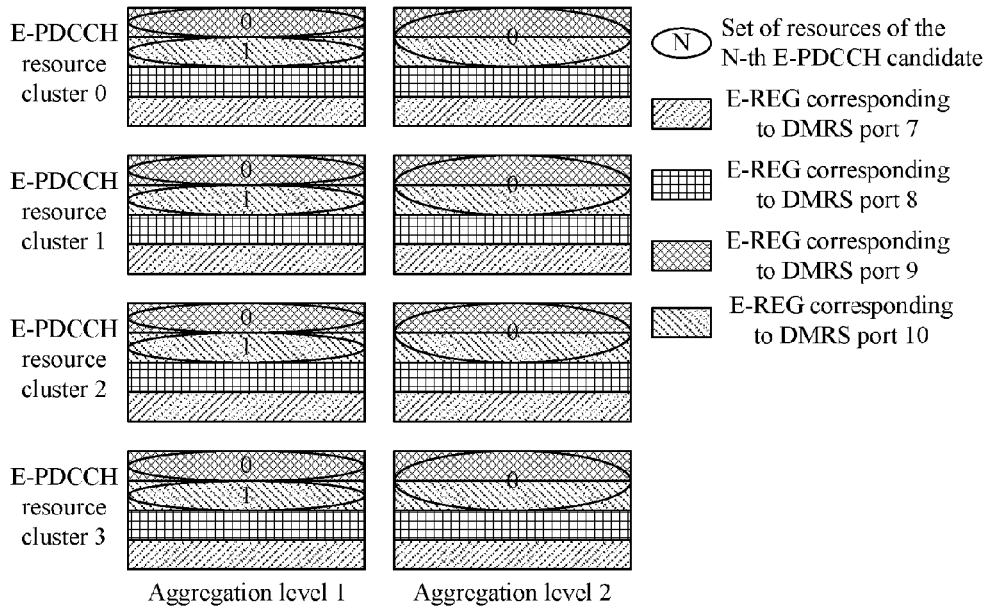
FIG. 10i and FIG. 10j illustrate schematic diagrams of resource mapping according to a third embodiment of the invention.
Figure 10J:
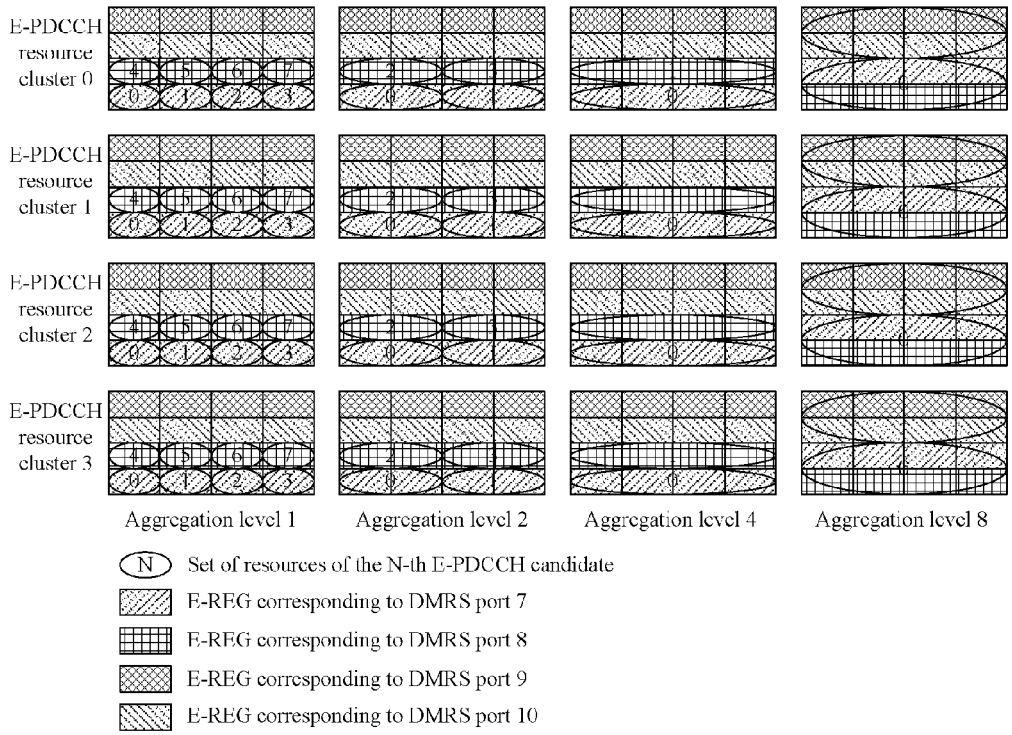

In this embodiment, a localized E-PDCCH time-frequency resource region overlaps with a distributed E-PDCCH time-frequency resource region, and there are localized E-PDCCHs and distributed E-PDCCHs multiplexed in the same PRB pair; and there are aggregation levels of {1,2} in a localized E-PDCCH search space, as illustrated in FIG. 10*i*, and there are aggregation levels of {1,2,4,8} in a distributed E-PDCCH search space, as illustrated in FIG. 10*j*. In this embodiment, the corresponding numbers of E-PDCCH candidates at the aggregation levels of {1,2,4,8} are {8,4,2,2} respectively.

In a first scenario, both the localized E-PDCCHs and the distributed E-PDCCHs coexist, that is, the base station transmits E-PDCCHs both in the localized transmission mode and in the distributed transmission mode. There are aggregation levels of {1,2} supported in the localized transmission mode and aggregation levels of {4,8} supported in the distributed transmission mode; and this scenario can be applicable to the UE being configured to feed back sub-band CQIs;

At the same aggregation level, the UE either performs blind detection in the localized E-PDCCH search space or performs blind detection in the distributed E-PDCCH search space but will not perform both of them concurrently. That is, the UE performs blind detection starting with a localized E-CCE numbered 0 respectively at the aggregation levels 1 and 2 in the localized E-PDCCH search space of each E-PDCCH resource cluster. The UE performs blind detection starting with a distributed E-CCE numbered 0 respectively at the aggregation levels 4 and 8 in the distributed E-PDCCH search space of four E-PDCCH resource clusters.

In a second scenario, there is only distributed transmission, that is, the base station only transmits E-PDCCHs in the distributed transmission mode in which there are supported aggregation modes of {1,2,4,8}, and this scenario can be applicable to the UE not being configured to feedback sub-band CQIs.

The UE performs blind detection starting with a distributed E-CCE numbered 0 respectively at the aggregation levels 1, 2, 4 and 8 in the distributed E-PDCCH search space of four E-PDCCH resource clusters.

Fourth Embodiment

Figure 10K:
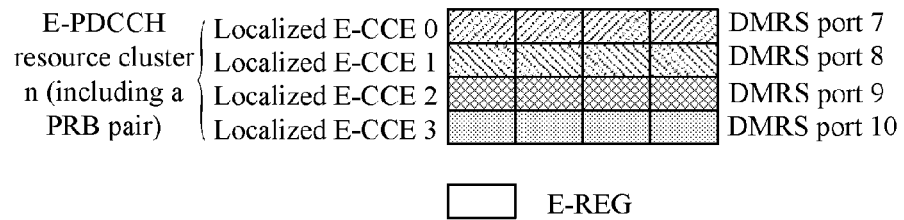
FIG. 10k illustrates a schematic diagram of resource mapping according to a fourth embodiment of the invention.

In this embodiment, FIG. 10*k* illustrates a correspondence relationship between a localized E-CCE and a DMRS port, and as illustrated in FIG. 10*k*, there are four localized E-CCEs in an E-PDCCH, including the localized E-CCE 0 corresponding to the DMRS port 7, the localized E-CCE 1 corresponding to the DMRS port 8, the localized E-CCE 2 corresponding to the DMRS port 9, and the localized E-CCE 3 corresponding to the DMRS port 10.

Fifth Embodiment

Figure 10L:
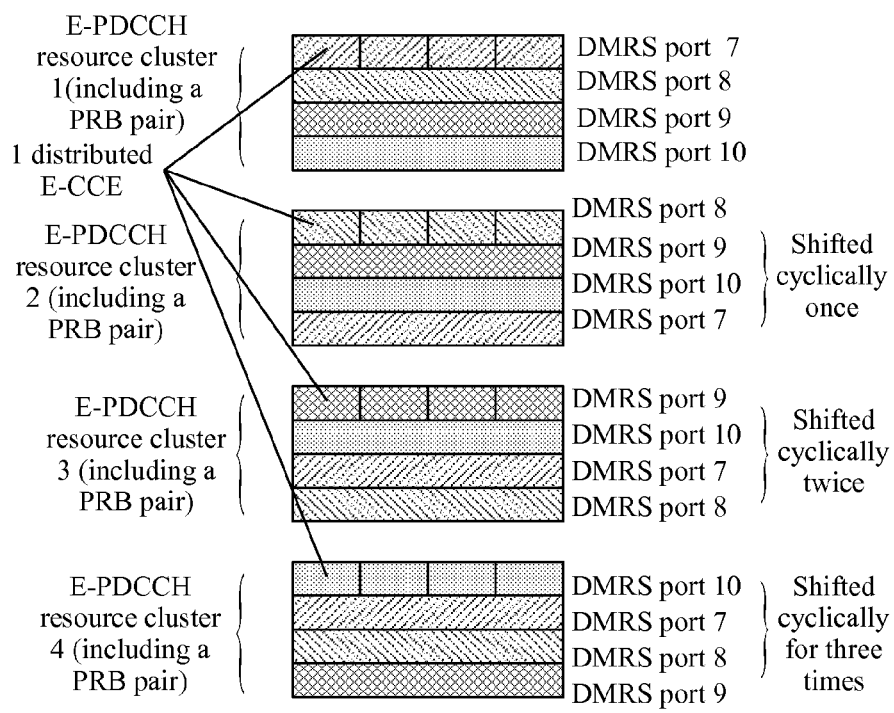
FIG. 10l illustrates a schematic diagram of resource mapping according to a fifth embodiment of the invention.

In this embodiment, further to the fourth embodiment, FIG. 10*l* illustrates an example of DMRS ports corresponding to E-REGs in respective E-PDCCH resource clusters in a distributed E-PDCCH time-frequency resource region.

Particularly for the 0th E-PDCCH resource cluster, i.e., the E-PDCCH resource cluster 1 in FIG. 10*l*, the localized E-CCE 0 corresponds to the DMRS port 7, the localized E-CCE 1 corresponds to the DMRS port 8, the localized E-CCE 2 corresponds to the DMRS port 9, and the localized E-CCE 3 corresponds to the DMRS port 10, and the port serial numbers of the respective determined DMRS ports skip cyclical shifting, i.e., are not shifted cyclically, thus remaining the DMRS ports corresponding to the respective localized E-CCEs unchanged, so that: the DMRS port corresponding to the E-REG located in the localized E-CCE 0 is the DMRS port corresponding to the localized E-CCE 0, i.e., the port 7; the DMRS port corresponding to the E-REG located in the localized E-CCE 1 is the DMRS port corresponding to the localized E-CCE 1, i.e., the port 8; the DMRS port corresponding to the E-REG located in the localized E-CCE 2 is the DMRS port corresponding to the localized E-CCE 2, i.e., the port 9; and the DMRS port corresponding to the E-REG located in the localized E-CCE 3 is the DMRS port corresponding to the localized E-CCE 3, i.e., the port 10;

For the first E-PDCCH resource cluster, i.e., the E-PDCCH resource cluster 2 in FIG. 10*l*, the localized E-CCE 0 corresponds to the DMRS port 7, the localized E-CCE 1 corresponds to the DMRS port 8, the localized E-CCE 2 corresponds to the DMRS port 9, and the localized E-CCE 3 corresponds to the DMRS port 10, and the port serial numbers 7, 8, 9 and 10 of the respective determined DMRS ports are shifted cyclically once resulting in the port serial numbers of new DMRS ports corresponding to the respective localized E-CCEs: the localized E-CCE 0 corresponds to the DMRS port 8, the localized E-CCE 1 corresponds to the DMRS port 9, the localized E-CCE 2 corresponds to the DMRS port 10, and the localized E-CCE 3 corresponds to the DMRS port 7, so that: the DMRS port corresponding to the E-REG located in the localized E-CCE 0 is the new DMRS port corresponding to the localized E-CCE 0, i.e., the port 8; the DMRS port corresponding to the E-REG located in the localized E-CCE 1 is the new DMRS port corresponding to the localized E-CCE 1, i.e., the port 9; the DMRS port corresponding to the E-REG located in the localized E-CCE 2 is the new DMRS port corresponding to the localized E-CCE 2, i.e., the port 10; and the DMRS port corresponding to the E-REG located in the localized E-CCE 3 is the new DMRS port corresponding to the localized E-CCE 3, i.e., the port 7;

For the second E-PDCCH resource cluster, i.e., the E-PDCCH resource cluster 3 in FIG. 10*l*, the localized E-CCE 0 corresponds to the DMRS port 7, the localized E-CCE 1 corresponds to the DMRS port 8, the localized E-CCE 2 corresponds to the DMRS port 9, and the localized E-CCE 3 corresponds to the DMRS port 10, and the port serial numbers 7, 8, 9 and 10 of the respective determined DMRS ports are shifted cyclically twice resulting in the port serial numbers of new DMRS ports corresponding to the respective localized E-CCEs: the localized E-CCE 0 corresponds to the DMRS port 9, the localized E-CCE 1 corresponds to the DMRS port 10, the localized E-CCE 2 corresponds to the DMRS port 7, and the localized E-CCE 3 corresponds to the DMRS port 8, so that: the DMRS port corresponding to the E-REG located in the localized E-CCE 0 is the new DMRS port corresponding to the localized E-CCE 0, i.e., the port 9; the DMRS port corresponding to the E-REG located in the localized E-CCE 1 is the new DMRS port corresponding to the localized E-CCE 1, i.e., the port 10; the DMRS port corresponding to the E-REG located in the localized E-CCE 2 is the new DMRS port corresponding to the localized E-CCE 2, i.e., the port 7; and the DMRS port corresponding to the E-REG located in the localized E-CCE 3 is the new DMRS port corresponding to the localized E-CCE 3, i.e., the port 8; and For the third E-PDCCH resource cluster, i.e., the E-PDCCH resource cluster 4 in FIG. 10*l*, the localized E-CCE 0 corresponds to the DMRS port 7, the localized E-CCE 1 corresponds to the DMRS port 8, the localized E-CCE 2 corresponds to the DMRS port 9, and the localized E-CCE 3 corresponds to the DMRS port 10, and the port serial numbers 7, 8, 9 and 10 of the respective determined DMRS ports are shifted cyclically for three times resulting in the port serial numbers of new DMRS ports corresponding to the respective localized E-CCEs: the localized E-CCE 0 corresponds to the DMRS port 10, the localized E-CCE 1 corresponds to the DMRS port 7, the localized E-CCE 2 corresponds to the DMRS port 8, and the localized E-CCE 3 corresponds to the DMRS port 9, so that: the DMRS port corresponding to the E-REG located in the localized E-CCE 0 is the new DMRS port corresponding to the localized E-CCE 0, i.e., the port 10; the DMRS port corresponding to the E-REG located in the localized E-CCE 1 is the new DMRS port corresponding to the localized E-CCE 1, i.e., the port 7; the DMRS port corresponding to the E-REG located in the localized E-CCE 2 is the new DMRS port corresponding to the localized E-CCE 2, i.e., the port 8; and the DMRS port corresponding to the E-REG located in the localized E-CCE 3 is the new DMRS port corresponding to the localized E-CCE 3, i.e., the port 9.

Since a distributed E-CCE includes the E-REG located in the localized E-CCE 0 in the E-PDCCH resource cluster 1, the E-PDCCH resource cluster 2, the E-PDCCH resource cluster 3, and the E-PDCCH resource cluster 4, then for a distributed E-CCE, E-REGs thereof in the different E-PDCCH resource clusters can be demodulated via the different DMRS ports for a spatial diversity gain.

Figure 11:
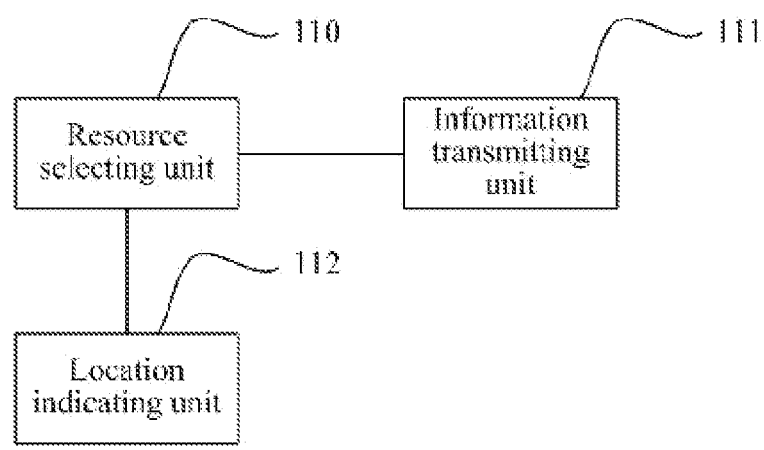
FIG. 11 illustrates a schematic structural diagram of a base station according to an embodiment of the invention.

Referring to FIG. 11, an embodiment of the invention provides a base station including:

A resource selecting unit 110 is configured, when downlink control information needs to be transmitted to a UE in a current sub-frame in a localized transmission mode, to select at least one available localized Enhanced Control Channel Element (E-CCE) in a localized E-PDCCH time-frequency resource region of the current sub-frame at a current aggregation level; and An information transmitting unit 111 is configured to transmit the downlink control information to the UE in the selected localized E-CCE;

Particularly the localized E-PDCCH time-frequency resource region includes at least one E-PDCCH resource cluster, each of which consists of at least one Physical Resource Block (PRB) pair consecutive in frequency domain in the current sub-frame; and each E-PDCCH resource cluster includes at least one localized E-CCE, and each localized E-CCE is a set of a part of Resource Elements (REs) in a PRB pair.

Furthermore the resource selecting unit 110 is configured:

To select an E-PDCCH resource cluster in the localized E-PDCCH time-frequency resource region of the current sub-frame; and to determine a localized E-PDCCH search space in the selected E-PDCCH resource cluster; and To select L available localized E-CCEs in the determined localized E-PDCCH search space, where L represents the current aggregation level.

Furthermore localized E-CCEs in each E-PDCCH resource cluster are numbered sequentially starting with 0 in an order of time-frequency resource, and a starting location of the localized E-PDCCH search space is at a localized E-CCE numbered 0.

Furthermore the resource selecting unit 110 is configured to determine the localized E-PDCCH search space in the selected E-PDCCH resource cluster as follows:

The serial numbers of the respective localized E-CCEs in the localized E-PDCCH search space in the selected E-PDCCH resource cluster are calculated in Equation 1 below:

$$(L \cdot m^{(n)} + i) \bmod N_{E\text{-}CCE,k}^{(n)};$$ Equation 1:

Where E-CCE,k represents the number of localized E-CCEs in the E-PDCCH resource cluster n selected in the current sub-frame k; $i=0,L,L-1$ with L representing the current aggregation level; and $m^{(n)}=0,L,M^{(L,n)}-1$ with $M^{(L,n)}$ representing the number of localized E-PDCCH candidates, in the selected E-PDCCH resource cluster n, to be monitored by the UE at the aggregation level L; and The localized E-PDCCH search space in the selected E-PDCCH resource cluster consists of the localized E-CCEs corresponding to the respective calculated serial numbers.

Furthermore $M^{(L,n)}=A/N'$, where A represents the total number of localized E-PDCCH candidates to be monitored by the UE at the aggregation level L, and N' represents the total number of E-PDCCH resource clusters in the localized E-PDCCH time-frequency resource region.

Furthermore the information transmitting unit 111 is configured:

To determine a DMRS port corresponding to the selected localized E-CCE according to a correspondence relationship, between the localized E-CCE and the DMRS port, preset for the E-PDCCH resource cluster where the selected localized E-CCE is located and to transmit a Reference Signal (RS) for demodulation to the UE via the determined DMRS port.

Furthermore the information transmitting unit 111 is configured:

When there are a plurality of localized E-CCEs selected, to select one of DMRS ports corresponding to the selected plurality of localized E-CCEs in Equation 3 below and to transmit the RS for demodulation to the UE via the selected DMRS port:

$$n_{port} = f(n_{eCCE}^{lowest} + \bmod(RNTI, L'));$$ Equation 3:

Where $n_{port}$ represents the index of a port, L' represents the number of localized E-CCEs occupied by localized E-PDCCHs in a PRB pair, $n_{eCCE}^{lowest}$ represents the serial number of the localized E-CCE with the lowest serial number in the current L' localized E-CCEs, and the function f( ) represents the index of a DMRS port corresponding to the serial number of a localized E-CCE, calculated in the expression bracketed in Equation 3, derived according to the correspondence relationship.

Furthermore DMRS ports corresponding to localized E-CCEs in the (i+1)-th E-PDCCH resource cluster in the localized E-PDCCH time-frequency resource region result from cyclic shifting of DMRS ports corresponding to localized E-CCEs in the i-th E-PDCCH resource cluster, where i represents an integer ranging from 0 to N'−1 with N' representing the total number of E-PDCCH resource clusters in the localized E-PDCCH time-frequency resource region.

Furthermore the base station further includes:

A location indicating unit 112 is configured to indicate location information of the localized E-PDCCH time-frequency resource region to the UE.

Furthermore the aggregation level is 1 or 2 or 4 or 8.

Figure 12:
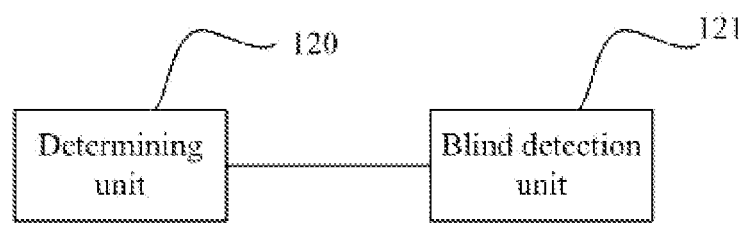
FIG. 12 illustrates a schematic structural diagram of a UE according to an embodiment of the invention.

Referring to FIG. 12, an embodiment of the invention provides a UE including:

A determining unit 120 is configured to determine a localized E-PDCCH time-frequency resource region in a current sub-frame, and aggregation levels supported in a localized transmission mode; and A blind detection unit 121 is configured to perform channel blind detection on a localized E-CCE in the localized E-PDCCH time-frequency resource region respectively at the respective aggregation levels supported in the localized transmission mode;

Particularly the localized E-PDCCH time-frequency resource region includes at least one E-PDCCH resource cluster, each of which consists of at least one PRB pair consecutive in frequency domain in the current sub-frame; and each E-PDCCH resource cluster includes at least one localized E-CCE, and each localized E-CCE is a set of a part of REs in a PRB pair.

Furthermore the blind detection unit 121 is configured:

To perform on each E-PDCCH resource cluster in the localized E-PDCCH time-frequency resource region of the current sub-frame the following operations of: determining a localized E-PDCCH search space in the current E-PDCCH resource cluster and performing channel blind detection on the localized E-CCE determined in the localized E-PDCCH search space respectively at the respective aggregation levels supported in the localized transmission mode.

Furthermore localized E-CCEs in each E-PDCCH resource cluster are numbered sequentially starting with 0 in an order of time-frequency resources, and a starting location of the localized E-PDCCH search space is at a localized E-CCE numbered 0.

Furthermore the blind detection unit 121 is configured to determine the localized E-PDCCH search space in the current E-PDCCH resource cluster as follows:

The serial numbers of the respective localized E-CCEs in the localized E-PDCCH search space in the current E-PDCCH resource cluster is calculated in Equation 1 below:

$$(L \cdot m^{(n)}+i) \bmod N_{E\text{-}CCE,k}^{(n)}; \quad \text{Equation 1:}$$

Where $N_{E\text{-}CCE,k}^{(n)}$ represents the serial number of localized E-CCEs in the current E-PDCCH resource cluster n in the current sub-frame k; i=0,L,L−1 with L representing the current aggregation level; and $m^{(n)}$=0,L,$M^{(L,n)}$−1 with $M^{(L,n)}$ representing the number of localized E-PDCCH candidates, in the current E-PDCCH resource cluster n, to be monitored by the UE at the aggregation level L; and The localized E-PDCCH search space in the current E-PDCCH resource cluster consists of the localized E-CCEs corresponding to the respective calculated numbers.

Furthermore $M^{(L,n)}$=A/N', where A represents the total number of localized E-PDCCH candidates to be monitored by the UE at the aggregation level L, and N' represents the total number of E-PDCCH resource clusters in the localized E-PDCCH time-frequency resource region.

Furthermore the blind detection unit 121 configured to perform channel blind detection on the localized E-CCE determined in the localized E-PDCCH search space is configured to determine a DMRS port corresponding to the localized E-CCE determined in the localized E-PDCCH search space according to a correspondence relationship, between the localized E-CCE and the DMRS port, preset for the current E-PDCCH resource cluster and to demodulate the localized E-CCE using an RS transmitted via the determined DMRS port.

Furthermore the blind detection unit 121 is configured:

When there are a plurality of localized E-CCEs determined in the localized E-PDCCH search space, to select one of DMRS ports corresponding to the plurality of localized E-CCEs in Equation 3 below and to demodulate the plurality of localized E-CCEs using an RS transmitted via the selected DMRS port:

$$n_{port}=f(n_{eCCE}^{lowest}+\bmod(\text{RNTI},L')); \quad \text{Equation 3:}$$

Where $n_{port}$ represents the index of a port, L' represents the number of localized E-CCEs occupied by localized E-PDCCHs in a PRB pair, $n_{eCCE}^{lowest}$ represents the serial number of the localized E-CCE with the lowest serial number in the current L' localized E-CCEs, and the function f( ) represents the index of a DMRS port corresponding to the serial number of a localized E-CCE, calculated in the expression bracketed in Equation 3, derived according to the correspondence relationship.

Furthermore DMRS ports corresponding to localized E-CCEs in the (i+1)-th E-PDCCH resource cluster in the localized E-PDCCH time-frequency resource region result from cyclic shifting of DMRS ports corresponding to localized E-CCEs in the i-th E-PDCCH resource cluster, where i represents an integer ranging from 0 to N'−1 with N' representing the total number of E-PDCCH resource clusters in the localized E-PDCCH time-frequency resource region.

Furthermore the determining unit 120 is configured:

To determine the localized E-PDCCH time-frequency resource region in the current sub-frame according to location information of the localized E-PDCCH time-frequency resource region pre-indicated by the base station.

Furthermore the aggregation level supported in the localized transmission mode includes one or any combination of 1, 2, 4 and 8.

Still referring to FIG. 11, an embodiment of the invention provides another base station including:

A resource selecting unit 110 is configured, when downlink control information needs to be transmitted to a UE in a current sub-frame in a distributed transmission mode, to select at least one available distributed E-CCE in a distributed E-PDCCH time-frequency resource region of the current sub-frame at a current aggregation level; and An information transmitting unit 111 is configured to transmit the downlink control information to the UE in the selected distributed E-CCE;

Particularly the distributed E-PDCCH time-frequency resource region includes N E-PDCCH resource clusters, where N represents an integer no less than 2; each E-PDCCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

Furthermore the resource selecting unit 110 is configured:

To determine a distributed E-PDCCH search space in the N E-PDCCH resource clusters; and To select L available distributed E-CCEs in the determined distributed E-PDCCH search space, where L represents the current aggregation level.

Furthermore the distributed E-CCEs in the N E-PDCCH resource clusters are numbered sequentially starting with 0 in an order of time-frequency resource; and the distributed E-CCEs are numbered in an opposite order to an order in which localized E-CCEs are numbered, where the opposite order of numbering refers to the serial number of a distributed E-CCE including an E-REG located in a localized E-CCE with a larger serial number is lower; and A starting location of the distributed E-PDCCH search space is at a distributed E-CCE numbered 0.

Furthermore the resource selecting unit 110 is configured to determine the distributed E-PDCCH search space in the N E-PDCCH resource clusters as follows:

The serial numbers of the respective distributed E-CCEs in the distributed E-PDCCH search space in the N E-PDCCH resource clusters are calculated in Equation 2 below:

$$(L \cdot m + i) \bmod N_{E\text{-}CCE,k}^{(all)};\qquad\text{Equation 2:}$$

Where $N_{E\text{-}CCE,k}^{(n)}$ represents the number of distributed E-CCEs in the N E-PDCCH resource clusters in the current sub-frame k; i=0,L,L−1 with L representing the current aggregation level; and m=0,L,$M^{(L)}$−1 with $M^{(L)}$ representing the number of distributed E-PDCCH candidates to be monitored by the UE at the aggregation level L; and The distributed E-PDCCH search space in the N E-PDCCH resource clusters consists of the distributed E-CCEs corresponding to the respective calculated serial numbers.

Furthermore the information transmitting unit 111 is further configured:

To determine a DMRS port corresponding to each E-REG in the selected distributed E-CCE, where the DMRS port corresponding to each E-REG is the same as a DMRS port corresponding to a localized E-CCE where the E-REG is located; and to transmit an RS for demodulation to the UE via the determined DMRS port.

DMRS ports corresponding to localized E-CCEs in the (i+1)-th one of the N E-PDCCH resource clusters result from cyclic shifting of DMRS ports corresponding to localized E-CCEs in the i-th E-PDCCH resource cluster, where i represents an integer ranging from 0 to N−1.

Furthermore the base station further includes:

A location indicating unit 112 is configured to indicate location information of the distributed E-PDCCH time-frequency resource region to the UE.

Furthermore the location indicating unit 112 is configured:

To indicate starting location information of the N respective E-PDCCH resource clusters respectively to the UE; or To indicate starting location information of one of the N E-PDCCH resource clusters to the UE; or To indicate a location offset of the distributed E-PDCCH time-frequency resource region relative to a localized E-PDCCH time-frequency resource region to the UE.

Furthermore the location indicating unit 112 is configured:

To indicate information of interval in frequency domain between the different E-PDCCH resource clusters to the UE together with the starting location information of one of the N E-PDCCH resource clusters.

Furthermore the aggregation level is 1 or 2 or 4 or 8.

Still referring to FIG. 12, an embodiment of the invention provides another UE including:

A determining unit 120 is configured to determine a distributed E-PDCCH time-frequency resource region in a current sub-frame, and aggregation levels supported in a distributed transmission mode; and A blind detection unit 121 is configured to perform channel blind detection on a distributed E-CCE in the distributed E-PDCCH time-frequency resource region respectively at the respective aggregation levels supported in the distributed transmission mode;

Particularly the distributed E-PDCCH time-frequency resource region includes N E-PDCCH resource clusters, where N represents an integer no less than 2; each E-PDCCH resource cluster consists of at least one PRB pair consecutive in frequency domain in the current sub-frame; and the N E-PDCCH resource clusters include at least one distributed E-CCE, each distributed E-CCE is a set of a part of E-REGs in at least two of the N E-PDCCH resource clusters, and each E-REG is a set of a part of REs in a PRB pair.

Furthermore the blind detection unit 121 is configured:

To determine a distributed E-PDCCH search space in the N E-PDCCH resource clusters; and To perform channel blind detection on the distributed E-CCE determined in the distributed E-PDCCH search space respectively at the respective aggregation levels supported in the distributed transmission mode.

Furthermore the distributed E-CCEs in the N E-PDCCH resource clusters are numbered sequentially starting with 0 in an order of time-frequency resource; and the distributed E-CCEs are numbered in an opposite order to an order in which localized E-CCEs are numbered, where the opposite order of numbering refers to the serial number of a distributed E-CCE including an E-REG located in a localized E-CCE with a larger serial number is lower; and A starting location of the distributed E-PDCCH search space is at a distributed E-CCE numbered 0.

Furthermore the blind detection unit 121 is configured to determine the distributed E-PDCCH search space in the N E-PDCCH resource clusters as follows:

The serial numbers of the respective distributed E-CCEs in the distributed E-PDCCH search space in the N E-PDCCH resource clusters are calculated in Equation 2 below:

$$(L \cdot m + i) \bmod N_{E\text{-}CCE,k}^{(all)};\qquad\text{Equation 2:}$$

Where $N_{E\text{-}CCE,k}^{(all)}$ represents the number of distributed E-CCEs in the N E-PDCCH resource clusters in the current sub-frame k; i=0,L,L−1 with L representing the current aggregation level; and m=0,L,$M^{(L)}$−1 with $M^{(L)}$ representing the number of distributed E-PDCCH candidates to be monitored by the UE at the aggregation level L; and The distributed E-PDCCH search space in the N E-PDCCH resource clusters consists of the distributed E-CCEs corresponding to the respective calculated serial numbers.

Furthermore the blind detection unit 121 configured to perform channel blind detection on the distributed E-CCE determined in the distributed E-PDCCH search space is configured to determine a DMRS port corresponding to each E-REG in the distributed E-CCE determined in the distributed E-PDCCH search space, where the DMRS port corresponding to each E-REG is the same as a DMRS port corresponding to a localized E-CCE where the E-REG is located; and to demodulate the distributed E-CCE using an RS transmitted via the determined DMRS port.

Furthermore DMRS ports corresponding to localized E-CCEs in the (i+1)-th one of the N E-PDCCH resource clusters result from cyclic shifting of DMRS ports corresponding to localized E-CCEs in the i-th E-PDCCH resource cluster, where i represents an integer ranging from 0 to N−1.

Furthermore the determining unit 120 is configured:

To determine the distributed E-PDCCH time-frequency resource region in the current sub-frame according to location information of the distributed E-PDCCH time-frequency resource region pre-indicated by the base station.

Furthermore the determining unit 120 is configured:

When the location information includes starting location information of the N respective E-PDCCH resource clusters, to determine the locations of the corresponding E-PDCCH resource clusters from the respective starting location information; or When the location information includes starting location information of one of the N E-PDCCH resource clusters, to determine the location of the E-PDCCH resource cluster from the starting location information and to determine the locations of the other (N−1) E-PDCCH resource clusters from the starting location information and information of interval in frequency domain between the different E-PDCCH resource clusters; or When the location information includes a location offset of the distributed E-PDCCH time-frequency resource region relative to a localized E-PDCCH time-frequency resource region, to determine the location of the distributed E-PDCCH time-frequency resource region from the location of the localized E-PDCCH time-frequency resource region and the location offset.

Furthermore the determining unit 120 is configured:

To obtain the information of interval in frequency domain between the different E-PDCCH resource clusters from signaling pre-transmitted by the base station or to determine the information of interval in frequency domain between the different E-PDCCH resource clusters as prescribed with the base station.

Furthermore the aggregation level supported in the distributed transmission mode includes one or any combination of 1, 2, 4 and 8.

In summary, advantageous effects of the invention are as follows:

In the first solution according to the embodiments of the invention, when downlink control information needs to be transmitted to a UE in a current sub-frame in a localized transmission mode, a base station selects at least one available localized Enhanced Control Channel Element (E-CCE) in a localized E-PDCCH time-frequency resource region of the current sub-frame at a current aggregation level and transmits the downlink control information to the UE in the selected localized E-CCE; and the UE performs channel blind detection on the localized E-CCE in the localized E-PDCCH time-frequency resource region respectively at the respective aggregation levels supported in the localized transmission mode. As can be apparent, this solution enables a solution to transmission of E-PDCCHs in the localized transmission mode to thereby address the problem of how to transmit downlink control information over E-PDCCHs in the localized transmission mode.

In the second solution according to the embodiments of the invention, when downlink control information needs to be transmitted to a UE in a current sub-frame in a distributed transmission mode, a base station selects at least one available distributed E-CCE in a distributed E-PDCCH time-frequency resource region of the current sub-frame at a current aggregation level and transmits the downlink control information to the UE in the selected distributed E-CCE; and the UE performs channel blind detection on the distributed E-CCE in the distributed E-PDCCH time-frequency resource region respectively at the respective aggregation levels supported in the distributed transmission mode. As can be apparent, this solution enables a solution to transmission of E-PDCCHs in the distributed transmission mode to thereby address the problem of how to transmit downlink control information over E-PDCCHs in the distributed transmission mode.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting an Enhanced Physical Downlink Control Channel, E-PDCCH, wherein the method comprises:

when downlink control information needs to be transmitted to a User Equipment, UE, in a current sub-frame in a localized transmission mode, selecting, by a base station, at least one available localized Enhanced Control Channel Element, E-CCEs, in a localized E-PDCCH time-frequency resource region of the current sub-frame at a current aggregation level; and transmitting, by the base station, the downlink control information to the UE in the selected localized E-CCE;

wherein the localized E-PDCCH time-frequency resource region comprises at least one E-PDCCH resource cluster, each of which consists of at least one Physical Resource Block, PRB, pair consecutive in frequency domain in the current sub-frame; and each E-PDCCH resource cluster comprises at least one localized E-CCE, and each localized E-CCE is a set of a part of Resource Elements, REs, in a PRB pair;

wherein transmitting, by the base station, the downlink control information to the UE in the selected localized E-CCE comprises:

determining, by the base station, a DMRS port corresponding to the selected localized E-CCE according to a correspondence relationship, between the localized E-CCE and the DMRS port, preset for the E-PDCCH resource cluster where the selected localized E-CCE is located, and transmitting a Reference Signal (RS) for demodulation to the UE via the determined DMRS port;

wherein when there are a plurality of localized E-CCEs selected, one of DMRS ports corresponding to the selected plurality of localized E-CCEs is selected in Equation 3 below, and the RS for demodulation is transmitted to the UE via the selected DMRS port:

$$n_{port}=f(n_{eCCE}^{lowest}+\mathrm{mod}(RNTI,L')),\qquad \text{Equation 3}$$

wherein $n_{port}$ represents index of a port, L' represents the number of localized E-CCEs occupied by localized E-PDCCHs in a PRB pair, $n_{eCCE}^{lowest}$ represents serial number of one of the current L' localized E-CCEs with a lowest serial number, and the function f( ) represents index of a DMRS port corresponding to serial number of a localized E-CCE, calculated in expression bracketed in Equation 3, derived according to the correspondence relationship.

2. The method according to claim 1, wherein:

DMRS ports corresponding to localized E-CCEs in a (i+1)-th E-PDCCH resource cluster in the localized E-PDCCH time-frequency resource region result from cyclic shifting of DMRS ports corresponding to localized E-CCEs in a i-th E-PDCCH resource cluster, wherein i represents an integer ranging from 0 to N'−1 with N' representing a total number of E-PDCCH resource clusters in the localized E-PDCCH time-frequency resource region;

wherein localized E-CCEs in each E-PDCCH resource cluster are numbered sequentially starting with 0 in an order of time-frequency resources.

3. A method for detecting an Enhanced Physical Downlink Control Channel, E-PDCCH, wherein the method comprises:

determining, by a User Equipment, UE, a localized E-PDCCH time-frequency resource region in a current sub-frame, and aggregation levels supported in a localized transmission mode; and performing, by the UE, channel blind detection on at least one localized Enhanced Control Channel Elements, E-CCEs, in the localized E-PDCCH time-frequency resource region respectively at the respective aggregation levels supported in the localized transmission mode;

wherein the localized E-PDCCH time-frequency resource region comprises at least one E-PDCCH resource cluster, each of which consists of at least one Physical Resource Block, PRB, pair consecutive in frequency domain in the current sub-frame; and each E-PDCCH resource cluster comprises at least one localized E-CCE, and each localized E-CCE is a set of a part of Resource Elements, REs, in a PRB pair;

wherein performing channel blind detection on the localized E-CCE in the localized E-PDCCH time-frequency resource region comprises:

determining a DMRS port corresponding to the localized E-CCE in the localized E-PDCCH time-frequency resource region according to a correspondence relationship, between the localized E-CCE and the DMRS port, preset for the current E-PDCCH resource cluster, and demodulating the localized E-CCE using an RS transmitted via the determined DMRS port;

wherein when there are a plurality of localized E-CCEs in a localized E-PDCCH, one of DMRS ports corresponding to the plurality of localized E-CCEs is selected in Equation 3 below, and the plurality of localized E-CCEs are demodulated using an RS transmitted via the selected DMRS port:

$$n_{port}=f(n_{eCCE}^{lowest}+\mathrm{mod}(RNTI,L')),\qquad \text{Equation 3}$$

wherein $n_{port}$ represents index of a port, L' represents the number of localized E-CCEs lowest occupied by localized E-PDCCHs in a PRB pair, $n_{eCCE}^{lowest}$ represents the serial number of one of the current L' localized E-CCEs with a lowest serial number, and the function f( ) represents index of a DMRS port corresponding to serial number of a localized E-CCE, calculated in expression bracketed in Equation 3, derived according to the correspondence relationship.

4. The method according to claim 3, wherein:

DMRS ports corresponding to localized E-CCEs in a (i+1)-th E-PDCCH resource cluster in the localized E-PDCCH time-frequency resource region result from cyclic shifting of DMRS ports corresponding to localized E-CCEs in a i-th E-PDCCH resource cluster, wherein i represents an integer ranging from 0 to N'−1 with N' representing a total number of E-PDCCH resource clusters in the localized E-PDCCH time-frequency resource region;

wherein localized E-CCEs in each E-PDCCH resource cluster are numbered sequentially starting with 0 in an order of time-frequency resources.

5. A base station, wherein the base station comprises:

a resource selecting unit configured, when downlink control information needs to be transmitted to a User Equipment, UE, in a current sub-frame in a localized transmission mode, to select at least one available localized Enhanced Control Channel Element, E-CCE, in a localized Enhanced Physical Downlink Control Channel, E-PDCCH, time-frequency resource region of the current sub-frame at a current aggregation level; and an information transmitting unit configured to transmit the downlink control information to the UE in the selected localized E-CCE;

wherein the localized E-PDCCH time-frequency resource region comprises at least one E-PDCCH resource cluster, each of which consist of at least one Physical Resource Block, PRB, pair consecutive in frequency domain in the current sub-frame; and each E-PDCCH resource cluster comprises at least one localized E-CCE, and each localized E-CCE is a set of a part of Resource Elements, REs, in a PRB pair;

wherein the information transmitting unit is configured:

to determine a DMRS port corresponding to the selected localized E-CCE according to a correspondence relationship, between the localized E-CCE and the DMRS port, preset for the E-PDCCH resource cluster wherein the selected localized E-CCE is located and to transmit a Reference Signal, RS, for demodulation to the UE via the determined DMRS port; and when there are a plurality of localized E-CCEs selected, to select one of DMRS ports corresponding to the selected plurality of localized E-CCEs in Equation 3 below and to transmit the RS for demodulation to the UE via the selected DMRS port:

$$n_{port} = f(n_{eCCE}^{lowest} + \text{mod}(RNTI, L')) \quad \text{Equation 3}$$

wherein $n_{port}$ represents the index of a port, L' represents the number of localized E-CCEs occupied by localized E-PDCCHs in a PRB pair, $n_{eCCE}^{lowest}$ represents the serial number of one of the current L' localized E-CCEs with a lowest serial number, and the function f( ) represents index of a DMRS port corresponding to serial number of a localized E-CCE, calculated in expression bracketed in Equation 3, derived according to the correspondence relationship.

6. The base station according to claim 5, wherein the information transmitting unit is configured to:

shift cyclically DMRS ports corresponding to localized E-CCEs in a i-th E-PDCCH resource cluster in the localized E-PDCCH time-frequency resource region resulting in DMRS ports corresponding to localized E-CCEs in a (i+1)-th E-PDCCH resource cluster, wherein i represents an integer ranging from 0 to N'−1 with N' representing a total number of E-PDCCH resource clusters in the localized E-PDCCH time-frequency resource region;

wherein localized E-CCEs in each E-PDCCH resource cluster are numbered sequentially starting with 0 in an order of time-frequency resources.

7. A User Equipment, UE, wherein the UE comprises:

a determining unit is configured to determine a localized Enhanced Physical Downlink Control Channel, E-PDCCH, time-frequency resource region in a current sub-frame, and aggregation levels supported in a localized transmission mode; and a blind detection unit is configured to perform channel blind detection on at least one localized Enhanced Control Channel Element, E-CCE, in the localized E-PDCCH time-frequency resource region respectively at the respective aggregation levels supported in the localized transmission mode to obtain downlink control information;

wherein the localized E-PDCCH time-frequency resource region comprises at least one E-PDCCH resource cluster, each of which consists of at least one Physical Resource Block, PRB, pair consecutive in frequency domain in the current sub-frame; and each E-PDCCH resource cluster comprises at least one localized E-CCE, and each localized E-CCE is a set of a part of Resource Elements, REs, in a PRB pair;

wherein the blind detection unit is configured:

to perform channel blind detection on the localized E-CCE in the localized E-PDCCH time-frequency resource region is configured to determine a DMRS port corresponding to the localized E-CCE in the localized E-PDCCH time-frequency resource region according to a correspondence relationship, between the localized E-CCE and the DMRS port, preset for the current E-PDCCH resource cluster and to demodulate the localized E-CCE using an RS transmitted via the determined DMRS port; and when there are a plurality of localized E-CCEs in a localized E-PDCCH, to select one of DMRS ports corresponding to the plurality of localized E-CCEs in Equation 3 below and to demodulate the plurality of localized E-CCEs using an RS transmitted via the selected DMRS port:

$$n_{port} = f(n_{eCCE}^{lowest} + \text{mod}(RNTI, L')), \quad \text{Equation 3}$$

wherein n on represents index of a port, L' represents the number of localized E-CCEs occupied by localized E-PDCCHs in a PRB pair, $n_{eCCE}^{lowest}$ represents the serial number of one of the current L' localized E-CCEs with a lowest serial number, and the function f( ) represents the index of a DMRS port corresponding to serial number of a localized E-CCE, calculated in the expression bracketed in Equation 3, derived according to the correspondence relationship.

8. The UE according to claim 7, wherein the blind detection unit is configured to:

shift cyclically DMRS ports corresponding to localized E-CCEs in a i-th E-PDCCH resource cluster in the localized E-PDCCH time-frequency resource region resulting in DMRS ports corresponding to localized E-CCEs in a (i+1)-th E-PDCCH resource cluster, wherein i represents an integer ranging from 0 to N'−1 with N' representing a total number of E-PDCCH resource clusters in the localized E-PDCCH time-frequency resource region;

wherein localized E-CCEs in each E-PDCCH resource cluster are numbered sequentially starting with 0 in an order of time-frequency resources.

* * * * *